United States Patent
Okada et al.

(10) Patent No.: US 8,315,474 B2
(45) Date of Patent: Nov. 20, 2012

(54) IMAGE PROCESSING DEVICE AND METHOD, AND IMAGE SENSING APPARATUS

(75) Inventors: Seiji Okada, Hirakata (JP); Satoru Takeuchi, Nagareyama (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 834 days.

(21) Appl. No.: 12/353,447

(22) Filed: Jan. 14, 2009

(65) Prior Publication Data

US 2009/0185760 A1 Jul. 23, 2009

(30) Foreign Application Priority Data

Jan. 18, 2008 (JP) .................................. 2008-009242
Dec. 1, 2008 (JP) .................................. 2008-306297

(51) Int. Cl.
*G06K 9/40* (2006.01)
(52) U.S. Cl. ...................................................... 382/260
(58) Field of Classification Search .................. 345/3.3; 348/208.13, 252, 333.11, 625, E13.017, E11.013; 358/3.07; 375/E7.107, E7.252; 382/255, 382/260, 263, 264, 299
See application file for complete search history.

(56) References Cited

U.S. PATENT DOCUMENTS

| | | | | |
|---|---|---|---|---|
| 7,215,831 B2 * | 5/2007 | Altunbasak et al. | .......... | 382/299 |
| 7,817,832 B2 * | 10/2010 | Deinzer | ........................ | 382/128 |
| 2005/0157949 A1 * | 7/2005 | Aiso et al. | ..................... | 382/299 |
| 2007/0195189 A1 * | 8/2007 | Kimoto | .......................... | 348/345 |
| 2009/0002504 A1 * | 1/2009 | Yano et al. | ................. | 348/218.1 |

FOREIGN PATENT DOCUMENTS

| | | | |
|---|---|---|---|
| CN | 101029956 A | * | 9/2007 |
| CN | 101029956 A | | 9/2007 |
| EP | 1 001 374 A2 | | 5/2000 |
| EP | 1001374 A2 | * | 5/2000 |
| JP | 2007151080 A | | 6/2007 |
| JP | 2005-197910 A | | 7/2008 |

OTHER PUBLICATIONS

Office Action issued on Oct. 26, 2011 in a corresponding Chinese application No. 200910002703.7 (including partial English translation and partial Japanese translation).

Office Action issued on May 9, 2012 in a corresponding Chinese application No. 200910002703.7 (including partial English translation).

English language abstract of CN101029956 A published Sep. 5, 2007.

* cited by examiner

*Primary Examiner* — Gregory F Cunningham
(74) *Attorney, Agent, or Firm* — NDQ&M Watchstone LLP

(57) ABSTRACT

An image processing device generates a high-resolution image from a plurality of low-resolution images, in which the high-resolution image has a resolution higher than a resolution of the low-resolution images. The image processing device includes a reference image setting portion for selecting a reference image from the plurality of low-resolution images based on image information of the plurality of low-resolution images. The image processing device generates the high-resolution image by performing a resolution increasing process on the plurality of low-resolution images for increasing a resolution with respect to the reference image.

20 Claims, 31 Drawing Sheets

FIG. 7

| -1 | -1 | -1 |
|----|----|----|
| -1 | 8  | -1 |
| -1 | -1 | -1 |

FIG. 18
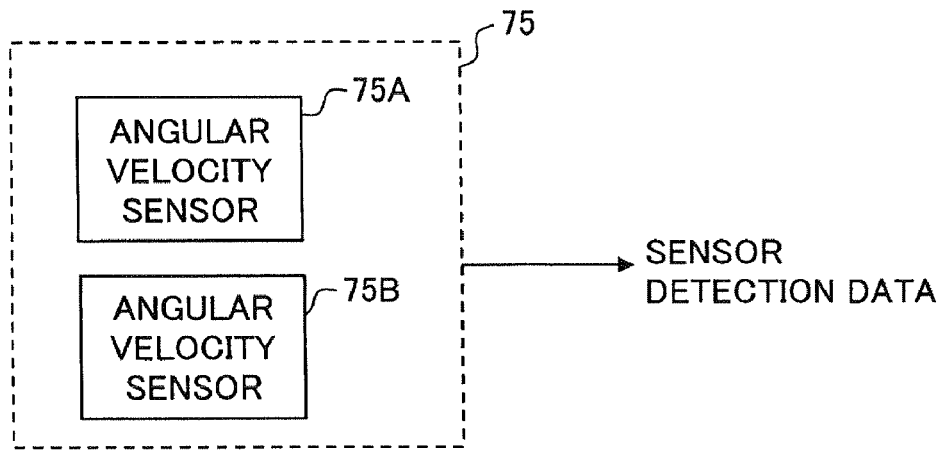
FIG. 19
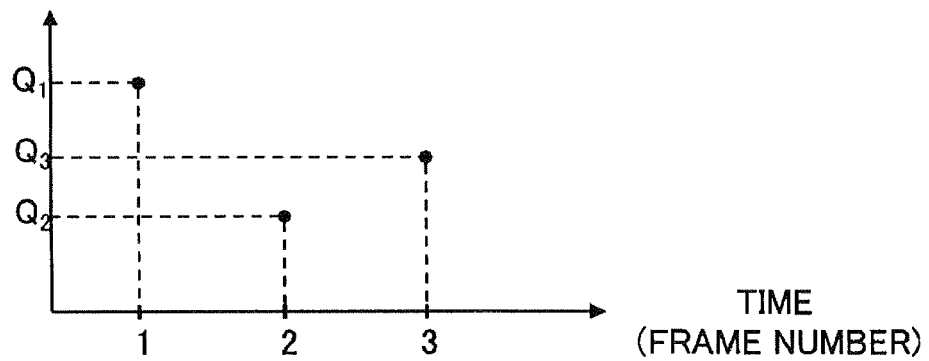
FIG. 20
IMAGE INFORMATION { IMAGE DATA
SENSOR DETECTION DATA

FIG. 30A

FIRST OBSERVED
LOW-RESOLUTION IMAGE

SECOND OBSERVED
LOW-RESOLUTION IMAGE

HIGH RESOLUTION IMAGE

•   •   •   •   •   •
•   •   •   •   •   •
•   •   •   •   •   •
•   •   •   •   •   •
•   •   •   •   •   •
•   •   •   •   •   •

$x^n = [x^n(0,0), x^n(0,1), ..., x^n(5,5)]^T$

W₁

| PSF₁(0,0) | PSF₁(0,1) | PSF₁(0,2) | PSF₁(0,3) | PSF₁(0,4) |
|---|---|---|---|---|
| PSF₁(1,0) | PSF₁(1,1) | PSF₁(1,2) | PSF₁(1,3) | PSF₁(1,4) |
| PSF₁(2,0) | PSF₁(2,1) | PSF₁(2,2) | PSF₁(2,3) | PSF₁(2,4) |
| PSF₁(3,0) | PSF₁(3,1) | PSF₁(3,2) | PSF₁(3,3) | PSF₁(3,4) |
| PSF₁(4,0) | PSF₁(4,1) | PSF₁(4,2) | PSF₁(4,3) | PSF₁(4,4) |

$W_2$

| $PSF_2(0,0)$ | $PSF_2(0,1)$ | $PSF_2(0,2)$ | $PSF_2(0,3)$ | $PSF_2(0,4)$ | $PSF_2(0,5)$ |
|---|---|---|---|---|---|
| $PSF_2(1,0)$ | $PSF_2(1,1)$ | $PSF_2(1,2)$ | $PSF_2(1,3)$ | $PSF_2(1,4)$ | $PSF_2(1,5)$ |
| $PSF_2(2,0)$ | $PSF_2(2,1)$ | $PSF_2(2,2)$ | $PSF_2(2,3)$ | $PSF_2(2,4)$ | $PSF_2(2,5)$ |
| $PSF_2(3,0)$ | $PSF_2(3,1)$ | $PSF_2(3,2)$ | $PSF_2(3,3)$ | $PSF_2(3,4)$ | $PSF_2(3,5)$ |
| $PSF_2(4,0)$ | $PSF_2(4,1)$ | $PSF_2(4,2)$ | $PSF_2(4,3)$ | $PSF_2(4,4)$ | $PSF_2(4,5)$ |
| $PSF_2(5,0)$ | $PSF_2(5,1)$ | $PSF_2(5,2)$ | $PSF_2(5,3)$ | $PSF_2(5,4)$ | $PSF_2(5,5)$ |

| PSF$_1$(0,0) | PSF$_1$(1,0) ■ | PSF$_1$(2,0) | PSF$_1$(3,0) ■ | PSF$_1$(4,0) |
|---|---|---|---|---|
| PSF$_1$(0,1) | PSF$_1$(1,1) | PSF$_1$(2,1) | PSF$_1$(3,1) | PSF$_1$(4,1) |
| PSF$_1$(0,2) | PSF$_1$(1,2) ■ | PSF$_1$(2,2) ★ | PSF$_1$(3,2) ■ | PSF$_1$(4,2) |
| PSF$_1$(0,3) | PSF$_1$(1,3) | PSF$_1$(2,3) | PSF$_1$(3,3) | PSF$_1$(4,3) |
| PSF$_1$(0,4) | PSF$_1$(1,4) ■ | PSF$_1$(2,4) | PSF$_1$(3,4) ■ | PSF$_1$(4,4) |

FIG. 36B $W_2^T$

| $PSF_2(0,0)$ | $PSF_2(1,0)$ | $PSF_2(2,0)$ | $PSF_2(3,0)$ | $PSF_2(4,0)$ | $PSF_2(5,0)$ |
|---|---|---|---|---|---|
| ▲$PSF_2(0,1)$ | $PSF_2(1,1)$ | ▲$PSF_2(2,1)$ | $PSF_2(3,1)$ | ▲$PSF_2(4,1)$ | $PSF_2(5,1)$ |
| $PSF_2(0,2)$ | $PSF_2(1,2)$ | $PSF_2(2,2)$ ★ | $PSF_2(3,2)$ | $PSF_2(4,2)$ | $PSF_2(5,2)$ |
| ▲$PSF_2(0,3)$ | $PSF_2(1,3)$ | ▲$PSF_2(2,3)$ | $PSF_2(3,3)$ | ▲$PSF_2(4,3)$ | $PSF_2(5,3)$ |
| $PSF_2(0,4)$ | $PSF_2(1,4)$ | $PSF_2(2,4)$ | $PSF_2(3,4)$ | $PSF_2(4,4)$ | $PSF_2(5,4)$ |
| ▲$PSF_2(0,5)$ | $PSF_2(1,5)$ | ▲$PSF_2(2,5)$ | $PSF_2(3,5)$ | ▲$PSF_2(4,5)$ | $PSF_2(5,5)$ |

FIG. 37

| | | | | | | | | |
|---|---|---|---|---|---|---|---|---|
| 0.4 | 0 | 0 | 0 | 0 | 0 | 0 | 0 | 0 |
| 0.1 | 0.1 | 0 | 0 | 0 | 0 | 0 | 0 | 0 |
| 0 | 0.4 | 0 | 0 | 0 | 0 | 0 | 0 | 0 |
| 0 | 0.1 | 0.1 | 0 | 0 | 0 | 0 | 0 | 0 |
| 0 | 0 | 0.4 | 0 | 0 | 0 | 0 | 0 | 0 |
| 0 | 0 | 0.1 | 0 | 0 | 0 | 0 | 0 | 0 |
| 0.1 | 0 | 0 | 0.1 | 0 | 0 | 0 | 0 | 0 |
| 0 | 0 | 0 | 0 | 0 | 0 | 0 | 0 | 0 |
| 0 | 0.1 | 0 | 0 | 0.1 | 0 | 0 | 0 | 0 |
| 0 | 0 | 0 | 0 | 0 | 0 | 0 | 0 | 0 |
| 0 | 0 | 0.1 | 0 | 0 | 0.1 | 0 | 0 | 0 |
| 0 | 0 | 0 | 0 | 0 | 0 | 0 | 0 | 0 |
| 0 | 0 | 0 | 0.4 | 0 | 0 | 0 | 0 | 0 |
| 0 | 0 | 0 | 0.1 | 0.1 | 0 | 0 | 0 | 0 |
| 0 | 0 | 0 | 0 | 0.4 | 0 | 0 | 0 | 0 |
| 0 | 0 | 0 | 0 | 0.1 | 0.1 | 0 | 0 | 0 |
| 0 | 0 | 0 | 0 | 0 | 0.4 | 0 | 0 | 0 |
| 0 | 0 | 0 | 0 | 0 | 0.1 | 0 | 0 | 0 |
| 0 | 0 | 0 | 0.1 | 0 | 0 | 0.1 | 0 | 0 |
| 0 | 0 | 0 | 0 | 0 | 0 | 0 | 0 | 0 |
| 0 | 0 | 0 | 0 | 0.1 | 0 | 0 | 0.1 | 0 |
| 0 | 0 | 0 | 0 | 0 | 0 | 0 | 0 | 0 |
| 0 | 0 | 0 | 0 | 0 | 0.1 | 0 | 0 | 0.1 |
| 0 | 0 | 0 | 0 | 0 | 0 | 0 | 0 | 0 |
| 0 | 0 | 0 | 0 | 0 | 0 | 0.4 | 0 | 0 |
| 0 | 0 | 0 | 0 | 0 | 0 | 0.1 | 0.1 | 0 |
| 0 | 0 | 0 | 0 | 0 | 0 | 0 | 0.4 | 0 |
| 0 | 0 | 0 | 0 | 0 | 0 | 0 | 0.1 | 0.1 |
| 0 | 0 | 0 | 0 | 0 | 0 | 0 | 0 | 0.4 |
| 0 | 0 | 0 | 0 | 0 | 0 | 0 | 0 | 0.1 |
| 0 | 0 | 0 | 0 | 0 | 0 | 0.1 | 0 | 0 |
| 0 | 0 | 0 | 0 | 0 | 0 | 0 | 0 | 0 |
| 0 | 0 | 0 | 0 | 0 | 0 | 0 | 0.1 | 0 |
| 0 | 0 | 0 | 0 | 0 | 0 | 0 | 0 | 0 |
| 0 | 0 | 0 | 0 | 0 | 0 | 0 | 0 | 0.1 |
| 0 | 0 | 0 | 0 | 0 | 0 | 0 | 0 | 0 |

IMAGE PROCESSING DEVICE AND METHOD, AND IMAGE SENSING APPARATUS

This nonprovisional application claims priority under 35 U.S.C. §119(a) on Patent Application No. 2008-009242 filed in Japan on Jan. 18, 2008 and Patent Application No. 2008-306297 filed in Japan on Dec. 1, 2008, the entire contents of which are hereby incorporated by reference.

BACKGROUND OF THE INVENTION

1. Field of the Invention

The present invention relates to an image processing device and an image processing method for performing image processing as well as an image sensing apparatus utilizing them.

2. Description of Related Art

As an image processing technique for converting a low-resolution image into a high-resolution image, super-resolution processing is proposed. An apparatus for performing the super-resolution processing refers to a plurality of low-resolution images having displacements (position displacements) and performs a resolution increasing process of the low-resolution images based on a displacement between the low-resolution images and image data of the plurality of low-resolution images so as to generate one high-resolution image. This resolution increasing process is performed with respect to a reference image selected from the plurality of low-resolution images, and a calculation of the displacement and other processes are performed with respect to the reference image. Therefore, contents of the obtained high-resolution image (including its image quality and composition) depend on the reference image largely. Note that the reference image is also referred to as a reference frame, a target frame, or the like.

Generally speaking, the reference image is to be an image generated first in an image sequence obtained by continuous shooting and arranged in a time sequence manner.

Since the contents of the high-resolution image obtained by the resolution increasing process depend on the reference image largely as described above, it is necessary to devise a method of selecting the reference image in order to obtain a desired high-resolution image.

SUMMARY OF THE INVENTION

The image processing device according to the present invention is an image processing device for generating a high-resolution image from a plurality of low-resolution images, the high-resolution image having a resolution higher than a resolution of the low-resolution images. The image processing device includes a reference image setting portion for selecting a reference image from the plurality of low-resolution images based on image information of the plurality of low-resolution images. The image processing device generates the high-resolution image by performing a resolution increasing process on the plurality of low-resolution images for increasing a resolution with respect to the reference image.

Specifically, for instance, the image processing device further includes a blur estimating portion for estimating an amount of blur included in each of the low-resolution images based on the image information. The reference image setting portion selects the reference image based on an estimation result of the blur estimating portion.

More specifically, for instance, the blur estimating portion estimates the amount of blur included in each of the low-resolution images based on amounts of high frequency components in each of the low-resolution images.

Alternatively, specifically, for instance, the plurality of low-resolution images constitute a low-resolution image sequence obtained by a sequential shooting operation of an image sensing apparatus and arranged in a time sequence manner. The blur estimating portion detects a state of shake of the image sensing apparatus during a shooting period of the low-resolution image sequence based on a displacement between low-resolution images neighboring temporally in the low-resolution image sequence, so as to estimate a large and small relationship of the amount of blur between the plurality of low-resolution images based on a detection result of the state of shake.

Further, for instance, the reference image setting portion selects the low-resolution image having the smallest estimated amount of blur as the reference image among the plurality of low-resolution images.

In addition, for instance, the low-resolution images are obtained by a shooting operation of an image sensing apparatus, the image information includes detection data of a sensor for detecting a state of shake of the image sensing apparatus during an exposure period of each of the low-resolution images, and the reference image setting portion selects the reference image based on the detection data of the sensor.

Further, for instance, the reference image setting portion selects the low-resolution image having the smallest shake of the image sensing apparatus during an exposure period as the reference image among the plurality of low-resolution images.

In addition, for instance, the image processing device may further include an object size detecting portion for detecting a size of a specific object on the image included in each of the low-resolution images based on the image information, and the reference image setting portion may select the reference image based on the detected size of the specific object.

Alternatively, for instance, the image processing device may further include a face state detecting portion for detecting a human face in each of the low-resolution images and for detecting a state of the human face based on the image information, and the reference image setting portion may select the reference image based on a detection result of the face state detecting portion.

Also specifically, for instance, the reference image setting portion sets a low-resolution image other than the reference image as an object image among the plurality of low-resolution images, and the image processing device further includes a displacement detecting portion for determining a displacement between the reference image and the object image by a resolution higher than a pixel interval of the reference image, and a high-resolution image generating portion for generating the high-resolution image by performing the resolution increasing process using the determined displacement and the plurality of low-resolution images with respect to the reference image.

A first image sensing apparatus according to the present invention includes an image sensing portion for obtaining a plurality of low-resolution images arranged in a time sequence manner by sequential shooting, and the image processing device described above for generating a high-resolution image with respect to the plurality of low-resolution images by a resolution increasing process.

A second image sensing apparatus according to the present invention includes an image sensing portion having an image sensor and an optical system for forming an optical image corresponding to an object on the image sensor so that a shot image is obtained, a focus score estimating portion for estimating a focus score based on a video signal of a focus evaluation region set in the shot image, so as to perform automatic focus control by driving and controlling the optical system based on the focus score, and an image processing device for referring to a plurality of shot images obtained from the image sensing portion as the plurality of low-resolution images and for generating a high-resolution image from the plurality of low-resolution images, the high-resolution image having a resolution higher than a resolution of the low-resolution images. The image processing device includes a reference image setting portion for selecting a reference image from the plurality of low-resolution images based on the focus score estimated with respect to each of the low-resolution images, so as to generate the high-resolution image by performing a resolution increasing process on the plurality of low-resolution images for increasing a resolution with respect to the reference image.

Specifically, for instance, the automatic focus control is performed by driving and controlling the optical system so that the focus score becomes a maximum value, and the reference image setting portion selects the low-resolution image corresponding to a maximum focus score as the reference image among the plurality of low-resolution images.

Also specifically, for instance, in the second image sensing apparatus, the reference image setting portion sets a low-resolution image other than the reference image as an object image among the plurality of low-resolution images, and the image processing device further includes a displacement detecting portion for determining a displacement between the reference image and the object image by a resolution higher than a pixel interval of the reference image, and a high-resolution image generating portion for generating the high-resolution image by performing the resolution increasing process using the determined displacement and the plurality of low-resolution images with respect to the reference image.

An image processing method according to the present invention is a method for generating a high-resolution image from a plurality of low-resolution images, in which the high-resolution image has a resolution higher than a resolution of the low-resolution images. The method includes the steps of selecting a reference image from the plurality of low-resolution images based on image information of the plurality of low-resolution images, and generating the high-resolution image by performing a resolution increasing process on the plurality of low-resolution images for increasing a resolution with respect to the reference image.

Note that the image information of the low-resolution image according to the present invention includes image data indicating a luminance value and/or color of each pixel of the low-resolution image and may further include the detection data described above.

Meanings and effects of the present invention will be more apparent from the following description of the embodiments. However, the embodiments described below are merely examples of the present invention, and the present invention and meanings of the terms of the structural elements should not be interpreted as limited to the embodiments described below.

BRIEF DESCRIPTION OF THE DRAWINGS

FIG. 7 is a diagram illustrating a Laplacian filter as an example of a high pass filter (HPF) of FIG. 6.

FIG. 18 is an internal block diagram of a sensor portion disposed in the image sensing apparatus according to Example 4 of the present invention.

FIG. 19 is a diagram illustrating an amplitude of the shake of the image sensing apparatus detected by the sensor portion of FIG. 18.

FIG. 20 is a diagram explicitly illustrating that image information includes image data and sensor detection data.

FIGS. 30A to 30C are diagrams illustrating a pixel arrangement of a first observed low-resolution image, a pixel arrangement of a second observed low-resolution image, and a pixel arrangement of a high-resolution image, respectively, according to Example 8 of the present invention.

FIG. 34 is a diagram illustrating an example of a matrix for reconstructing the low-resolution image from the high-resolution image according to Example 8 of the present invention.

FIGS. 36A and 36B are diagrams illustrating point spread functions in transpose matrices $W_1^T$ and $W_2^T$, respectively, which are used for calculating feedback values according to Example 8 of the present invention.

FIG. 37 is a diagram illustrating a transposed matrix of the matrix illustrated in FIG. 34.

DETAILED DESCRIPTION OF THE PREFERRED EMBODIMENTS

Figure 1:
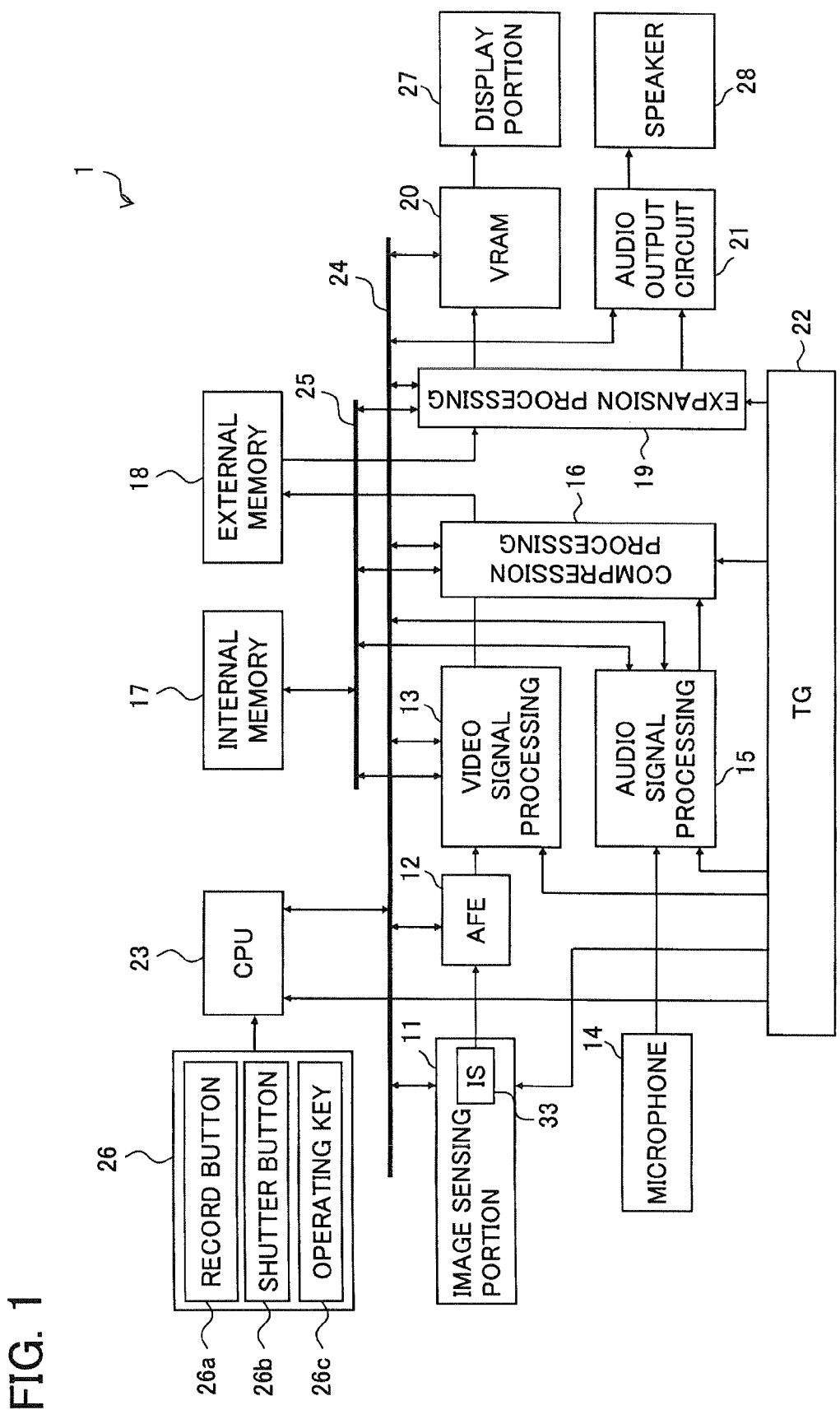
FIG. 1 is a general block diagram of an image sensing apparatus according to an embodiment of the present invention.

Hereinafter, embodiments of the present invention will be described specifically with reference to the attached drawings. In the individual drawings to be referred to, the same part is denoted by the same reference numeral so that overlapping description of the same part is omitted in principle. Although Example 1 to Example 8 will be described later, the matters that are common to the examples or that are referred to in the examples will be described first.

FIG. 1 is a general block diagram if an image sensing apparatus 1 according to an embodiment of the present invention. The image sensing apparatus 1 is a digital video camera, for example. The image sensing apparatus 1 can obtain moving images as well as still images, and it can also obtain still images at the same time when moving images are being obtained. Note that it is possible to omit the moving image obtaining function so that the image sensing apparatus 1 is realized as a digital still camera that can obtain only still images.

[Description of Basic Structure]

The image sensing apparatus 1 includes an image sensing portion 11, an analog front end (AFE) 12, a video signal processing portion 13, a microphone 14, an audio signal processing portion 15, a compression processing portion 16, an internal memory 17 such as a synchronous dynamic random access memory (SDRAM), an external memory 18 such as a secure digital (SD) card or a magnetic disk, an expansion processing portion 19, a video random access memory (VRAM) 20, an audio output circuit 21, a timing generator (TG) 22, a central processing unit (CPU) 23, a bus 24, a bus 25, an operating portion 26, a display portion 27, and a speaker 28. The operating portion 26 includes a record button 26a, a shutter button 26b, and an operating key 26c, and the like. Each of the individual portions of the image sensing apparatus 1 receives and sends signals (data) with other portions via the bus 24 or 25.

The TG 22 generates timing control signal for controlling timings of individual operations in the entire image sensing apparatus 1 and supplied the generated timing control signal to the individual portions in the image sensing apparatus 1. The timing control signal includes a vertical synchronizing signal Vsync and a horizontal synchronizing signal Hsync. The CPU 23 controls the operations of the individual portions in the image sensing apparatus 1 in a centralized manner. The operating portion 26 receives an operation instruction issued by a user. The content of the operation instruction supplied to the operating portion 26 is transmitted to the CPU 23. The individual portions in the image sensing apparatus 1 store various data (digital signals) in the internal memory 17 temporarily upon signal processing as necessary.

The image sensing portion 11 includes an image sensor 33, an optical system, a diaphragm and a driver (not illustrated in FIG. 1). Incident light from an object enters the image sensor 33 via the optical system and the diaphragm. Lenses constituting the optical system form an optical image of the object on the image sensor 33. The TG 22 generates a drive pulse for driving the image sensor 33 in synchronization with the timing control signal and supplies the drive pulse to the image sensor 33.

The image sensor 33 is made up of a charge coupled device (CCD), a complementary metal oxide semiconductor (CMOS) image sensor or the like, for example. The image sensor 33 performs a photoelectric conversion of the optical image supplied via the optical system and the diaphragm and outputs an electric signal obtained by the photoelectric conversion to the AFE 12. More specifically, the image sensor 33 includes a plurality of pixels (light receiving pixels, not illustrated) arranged in a two-dimensional manner like a matrix, and each of the pixels accumulates a signal charge corresponding to exposure time and light intensity in each shooting. The electric signal proportional to the accumulated signal charge at each pixel is sequentially output to the subsequent AFE 12 in accordance with the drive pulse from the TG 22.

The AFE 12 amplifies an analog signal output from the image sensor 33, converts the amplified analog signal into a digital signal, and outputs the digital signal to the video signal processing portion 13. An amplification degree of the signal amplification in the AFE 12 is controlled by the CPU 23. The video signal processing portion 13 performs various types of image processing on the image expressed by an output signal of the AFE 12, and it generates a video signal of the image after the image processing. The video signal is made up of a luminance signal Y indicating a luminance value of the image and color difference signals U and V indicating the color of the image.

The microphone 14 converts surrounding sounds of the image sensing apparatus 1 into an analog audio signal, and the audio signal processing portion 15 converts the analog audio signal into a digital audio signal.

The compression processing portion 16 compresses the video signal from the video signal processing portion 13 by using a predetermined compression method. When a moving image or a still image is shot and recorded, the compressed video signal is recorded in the external memory 18. In addition, the compression processing portion 16 compresses the audio signal from the audio signal processing portion 15 by using a predetermined compression method. When a moving image is shot and recorded, the video signal from the video signal processing portion 13 and the audio signal from the audio signal processing portion 15 are compressed while being associated with each other in a temporal manner by the compression processing portion 16. The compressed signals are recorded in the external memory 18.

The record button 26a is a press button switch for instructing the start or the end of shooting and recording the moving image, and the shutter button 26b is a press button switch for instructing the shooting and the recording of the still image.

Operating modes of the image sensing apparatus 1 includes a shooting mode in which moving images and still images can be obtained, and a reproducing mode for reproducing and displaying the moving image and the still image stored in the external memory 18 on the display portion 27. In accordance with an operation of the operating key 26c, transition among individual modes is performed. In the shooting mode, the sequential shooting is performed at a predetermined frame period, so that the image sequence arranged in a time sequence manner is obtained from the image sensor 33. Each image constituting this image sequence is referred to as a "frame image".

When the user presses the record button 26a in the shooting mode, the video signal of each frame image and the audio signal corresponding thereto that obtained after the pressing operation are sequentially recorded in the external memory 18 via the compression processing portion 16 under control of the CPU 23. When the user presses the record button 26a again after the start of shooting the moving image, the recording of the video signal and the audio signal in the external memory 18 is finished so that the shooting of the moving image is completed. Further, if the user presses the shutter button 26b in the shooting mode, shooting and recording of a still image is performed.

When the user performs a predetermined operation using the operating key 26c in the reproducing mode, the compressed video signal stored in the external memory 18 that indicates the moving image or the still image is expanded by the expansion processing portion 19 and then is written in the VRAM 20. Note that the generation of the video signal is performed sequentially by the video signal processing portion 13 usually in the shooting mode regardless of the operation contents using the record button 26a and the shutter button 26b, and the video signal is written in the VRAM 20 sequentially.

The display portion 27 is a display device such as a liquid crystal display for displaying the image corresponding to the video signal written in the VRAM 20. In addition, when the moving image is reproduced in the reproducing mode, the compressed audio signal corresponding to the moving image recorded in the external memory 18 is also sent to the expansion processing portion 19. The expansion processing portion 19 expands the received audio signal and sends the expanded signal to the audio output circuit 21. The audio output circuit 21 converts the supplied digital audio signal into an audio signal having a form that can be output by the speaker 28 (e.g., an analog audio signal) and outputs the converted signal to the speaker 28. The speaker 28 outputs the audio signal from the audio output circuit 21 as sound to the outside.

The video signal processing portion 13 is adapted to be capable of performing the super-resolution processing while cooperating with the CPU 23. By the super-resolution processing, one high-resolution image is generated from a plurality of low-resolution images. The video signal of the high-resolution image can be recorded in the external memory 18 via the compression processing portion 16. A resolution of the high-resolution image is higher than a resolution of the low-resolution image, and the numbers of pixels in the horizontal direction and in the vertical direction of the high-resolution image are larger than those of the low-resolution image. For instance, when an instruction to shoot a still image is issued, a plurality of frame images are obtained as the plurality of low-resolution images, and the super-resolution processing is performed on them so that the high-resolution image is generated. Alternatively, for instance, the super-resolution processing is performed on a plurality of frame images as the plurality of low-resolution images obtained when a moving image is shot.

Figure 2:
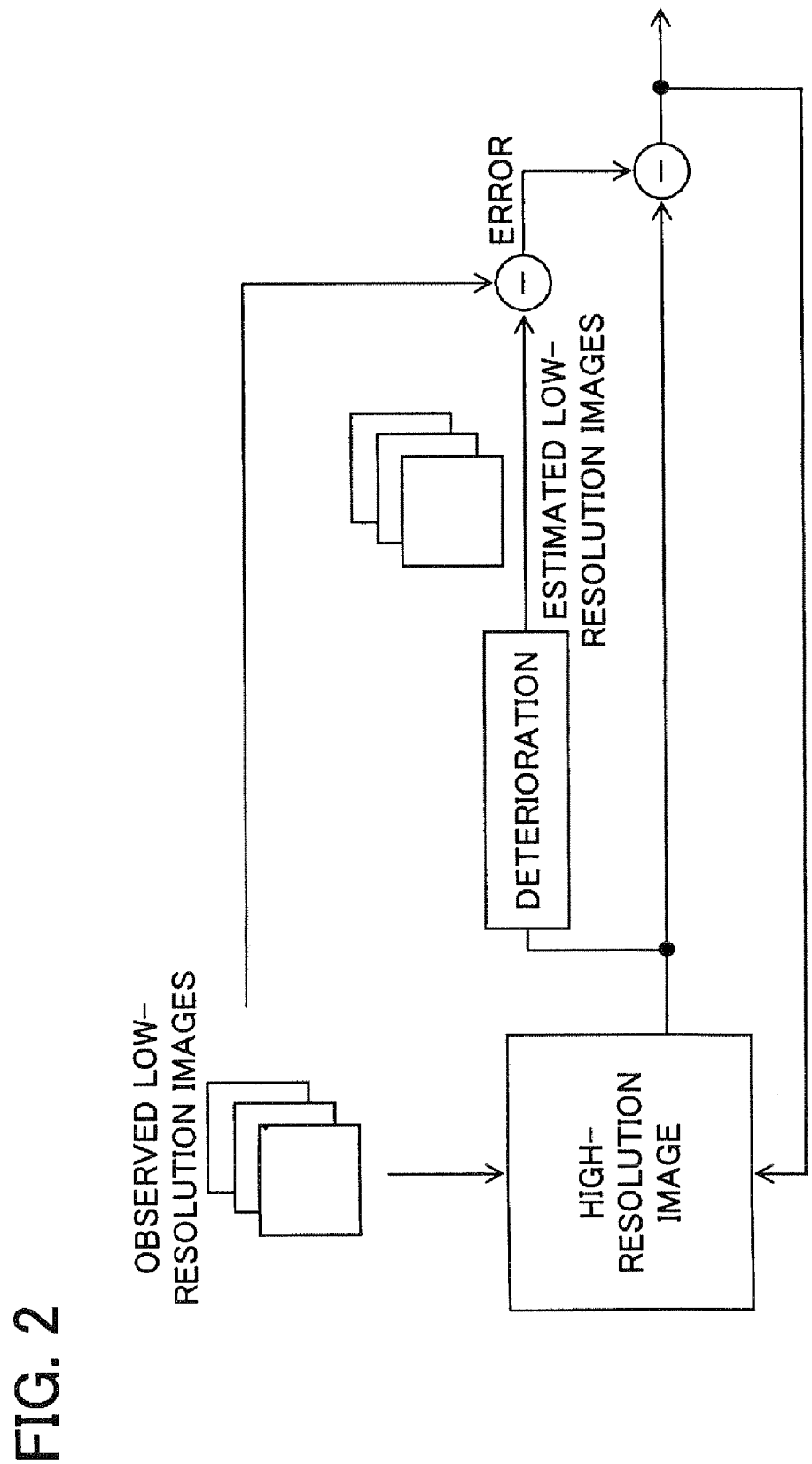
FIG. 2 is a conceptional diagram of the super-resolution processing using a MAP method.

A fundamental concept of the super-resolution processing will be described briefly. As an example, the super-resolution processing using a reconstruction-based method will be described. FIG. 2 illustrates a conceptional diagram of the super-resolution processing using a maximum a posterior (MAP) method as one type of the reconstruction-based method. In this super-resolution processing, one high-resolution image is estimated from a plurality of low-resolution images obtained by actual shooting, and the estimated high-resolution image is deteriorated so as to estimate the plurality of original low-resolution images. The low-resolution image obtained by actual shooting is referred to as an "observed low-resolution image" in particular, and the low-resolution image that is estimated is referred to as an "estimated low-resolution image" in particular. After that, the high-resolution image and the low-resolution images are estimated repeatedly so that an error between the observed low-resolution image and the estimated low-resolution image is minimized. The high-resolution image that is finally obtained is output.

Figure 3:
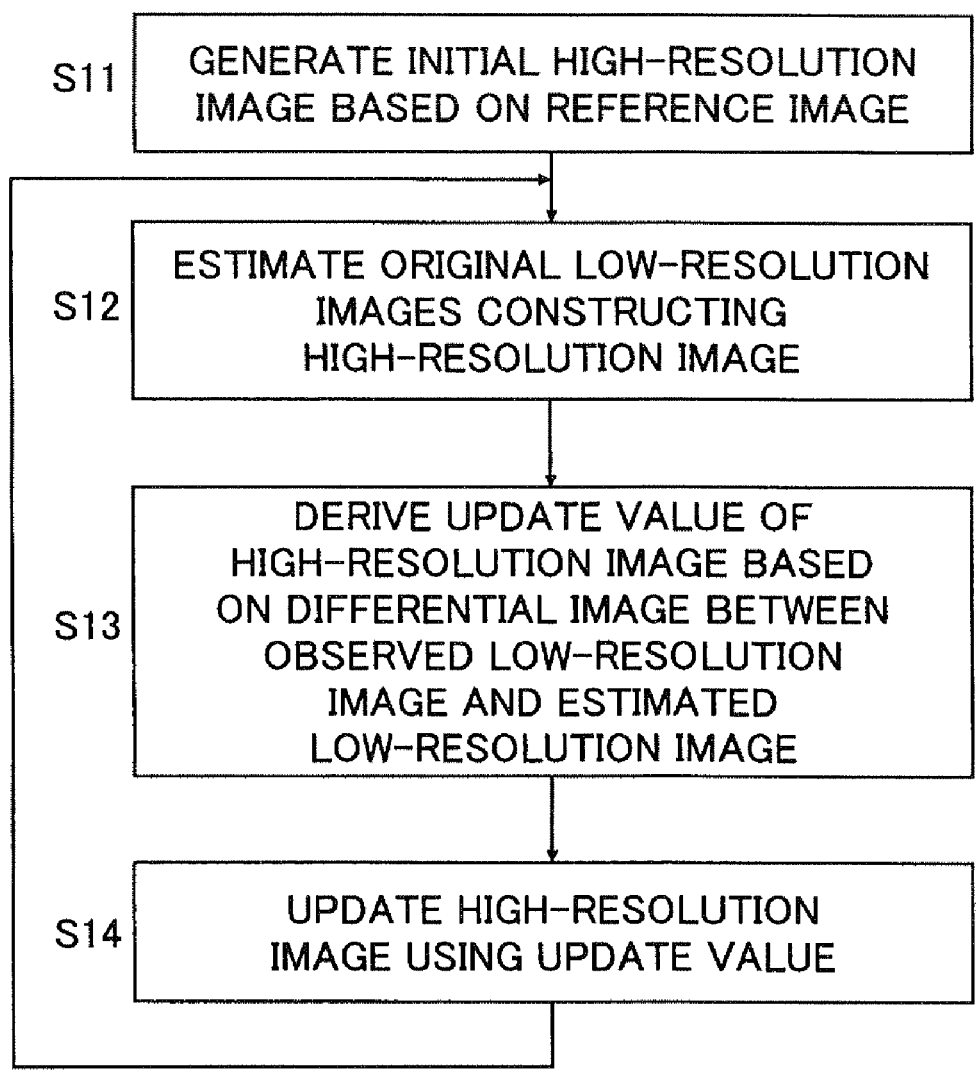
FIG. 3 is a flowchart illustrating a flow of super-resolution processing according to the embodiment of the present invention.

FIG. 3 illustrates a flowchart of the super-resolution processing. First, in Step S11, an initial high-resolution image is generated. This initial high-resolution image is generated from a reference image that will be described later. In the next Step S12, original observed low-resolution images constructing the current high-resolution image are estimated. The estimated image is referred to as the estimated low-resolution image as described above. In the next Step S13, an update value of the current high-resolution image is calculated based on a differential image between the observed low-resolution image and the estimated low-resolution image. This update value is calculated by the iterative operation of the processes in Steps S12 to S14 so that an error between the observed low-resolution image and the estimated low-resolution image is minimized. Then, in the next Step S14, the update value is used for updating the current high-resolution image so that a new high-resolution image is generated. After that, going back to Step S12, the newly generated high-resolution image is regarded as the current high-resolution image for repeating the processes in Steps S12 to S14. Basically, as the number of repeating times of the processes in Steps S12 to S14 increases, the resolution of the obtained high-resolution image is substantially improved so that the high-resolution image close to the ideal can be obtained.

The super-resolution processing in accordance with the fundamental flow of operation described above is performed in the image sensing apparatus 1. Although the super-resolution processing performed in the image sensing apparatus 1 can be any type of super-resolution processing, the case where the super-resolution processing of the reconstruction-based method is adopted will be described in the present embodiment. The reconstruction-based method includes a maximum-likelihood (ML) method, a maximum a posterior (MAP) method, a projection onto convex set (POCS) method, an iterative back projection (IBP) method and the like. In the present embodiment, a structure in which the MAP method is adopted will be exemplified.

As examples of the super-resolution processing, the following Examples 1 to 8 will be described. The item described in a certain example can be applied to other examples as long as there is no contradiction.

EXAMPLE 1

Figure 4:
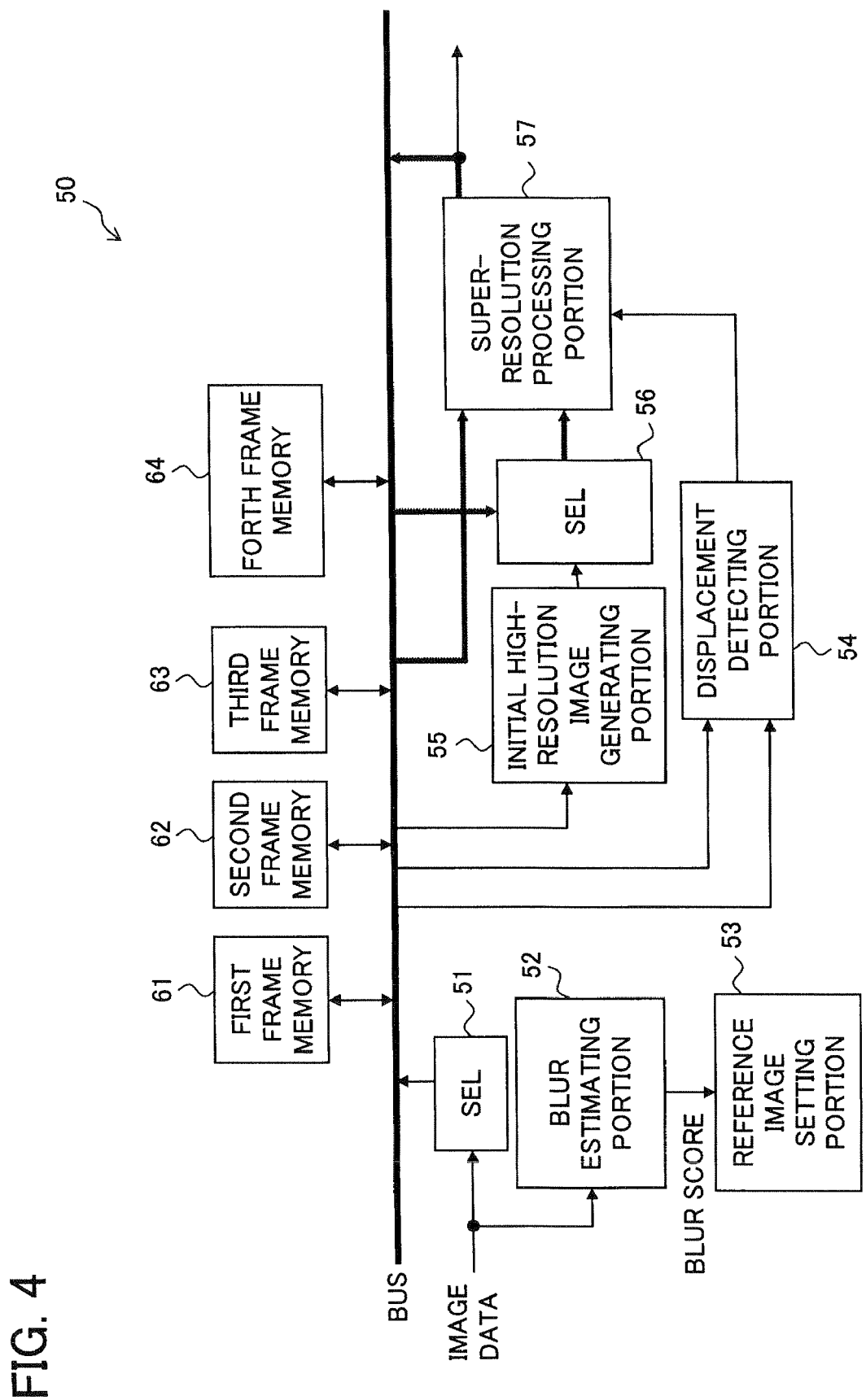
FIG. 4 is an internal block diagram of a super-resolution portion for performing the super-resolution processing according to Example 1 of the present invention.
Figure 5:
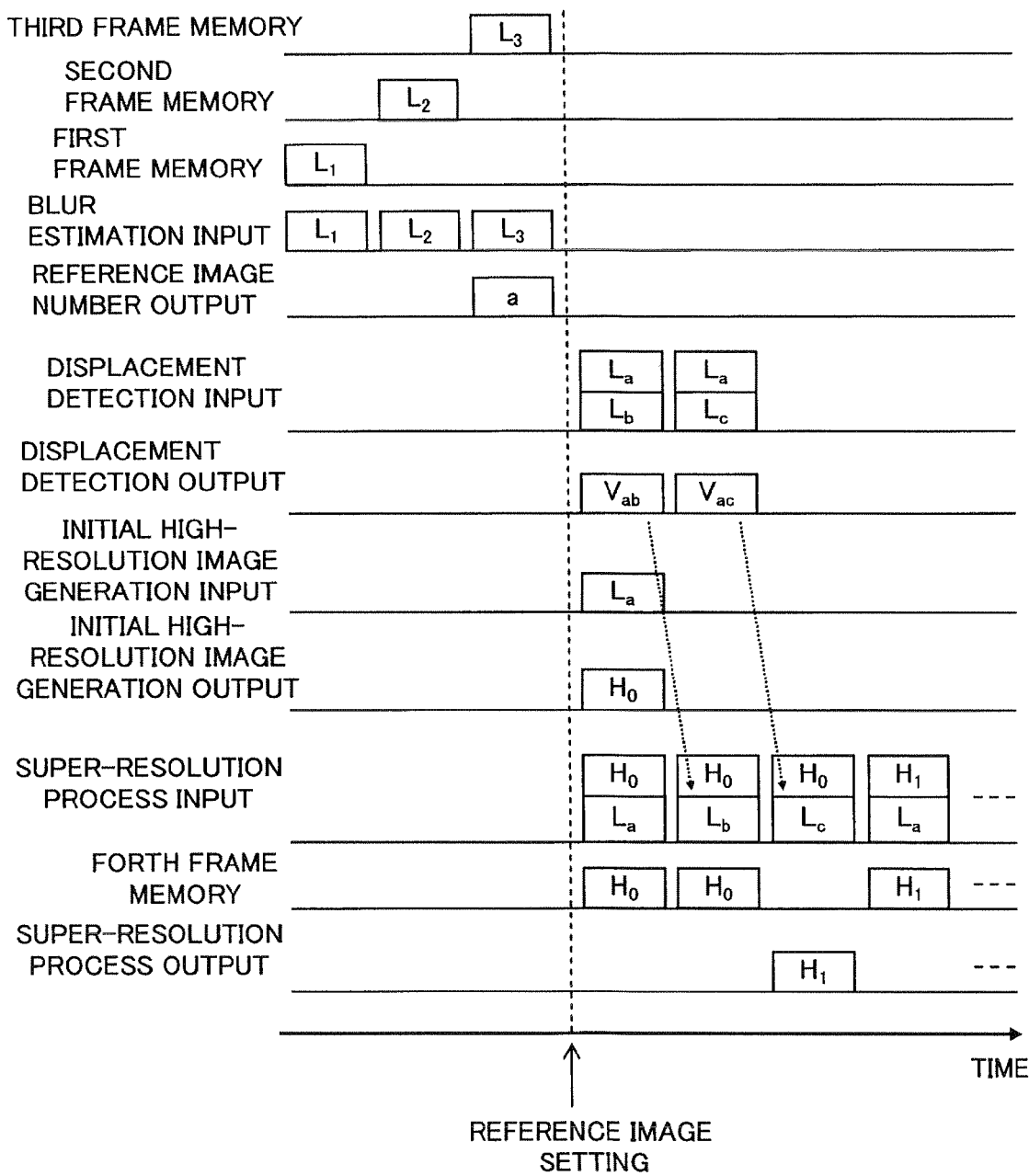
FIG. 5 is a diagram illustrating a flow of sequential operations of individual portions of FIG. 4.

First, Example 1 will be described. FIG. 4 is an internal block diagram of a super-resolution portion 50 for performing the super-resolution processing. Individual portions denoted by reference numerals 51, 52, 54 to 57 are disposed in the video signal processing portion 13 of FIG. 1, and first, second, third and fourth frame memories 61, 62, 63 and 64 are disposed in the internal memory 17 of FIG. 1. A function of a reference image setting portion 53 is realized by the CPU 23. However, it is possible to adopt another structure in which the function of the reference image setting portion 53 is realized by the video signal processing portion 13. Hereinafter, the first, the second, the third and the fourth frame memories are each simply referred to as a frame memory. The frame memories 61 to 63 are memories for storing image data of the frame images as the observed low-resolution images, and the frame memory 64 is a memory for storing image data of the high-resolution image. FIG. 5 is a diagram illustrating a flow of operations of the individual portions in FIG. 4 in a time sequential manner, and the horizontal direction in FIG. 5 corresponds to the time direction. Note that the image data of a certain noted image is data indicating luminance and color of the noted image (e.g., RGB signals or YUV signals).

In Example 1, the case where one high-resolution image is generated from three observed low-resolution images is exemplified. The three observed low-resolution images are three frame images that are shot continuously. The three observed low-resolution images are denoted by $L_1$, $L_2$ and $L_3$, and it is supposed that the observed low-resolution images $L_1$, $L_2$ and $L_3$ are shot in this order. In the following description, the observed low-resolution images $L_1$, $L_2$ and $L_3$ may be referred to in a short form as images $L_1$, $L_2$ and $L_3$, respectively (the same is true for $L_4$ and the like that will be described later). It is supposed that a displacement (a position displacement) due to a hand vibration or the like occurs between two different images among the images $L_1$, $L_2$ and $L_3$.

Since the images $L_1$, $L_2$ and $L_3$ are shot in this order, the image data indicating the image $L_1$ is first supplied to the selecting portion 51 and the blur estimating portion 52. Then, the image data indicating the image $L_2$ is supplied, and further the image data indicating the image $L_3$ is supplied to the selecting portion 51 and the blur estimating portion 52. The selecting portion 51 selects the frame memory in which the supplied image data of the observed low-resolution image should be stored. Specifically, the selecting portion 51 sends the image data of the image $L_1$, the image data of the image $L_2$ and the image data of the image $L_3$ to the frame memories 61, 62 and 63, respectively, so that the image data are stored.

The blur estimating portion 52 is a portion for estimating an amount of blur (hereinafter referred to as a blur) included in the supplied image, so as to calculate a blur score corresponding to the blur. The blur estimating portion 52 first calculates the blur score corresponding to the blur of the image $L_1$ based on the image data of the image $L_1$, and then calculates the blur score corresponding to the blur of the image $L_2$ based on the image data of the image $L_2$, and further calculates the blur score corresponding to the blur of the image $L_3$ based on the image data of the image $L_3$. The blur scores are sent to the reference image setting portion 53 one by one.

A so-called hand vibration may be exerted on a body of the image sensing apparatus 1 during an exposure period of the observed low-resolution image in the case where the image sensing apparatus 1 is held by hands. In addition, a so-called object blur (object vibration) may occur in some cases. The object blur means a blur of an object on the image caused by a movement of the object in the real space during the exposure period. If the hand vibration or the object blur (object vibration) occurs concerning the noted observed low-resolution image, the entire or a part of the noted observed low-resolution image may be blurred due to the hand vibration or object blur (object vibration). The blur estimating portion 52 estimates the amount of blur due to the hand vibration or the object blur (object vibration) based on the image data of the observed low-resolution image.

The blur estimating portion 52 estimates the blur by utilizing characteristics that the hand vibration or the object blur (object vibration) causes the attenuation of high frequency components in the image, for instance. In other words, it extracts a predetermined high frequency component in the observed low-resolution image and estimates the blur based on amount of the extracted high frequency component. The amount of the high frequency component is also referred to as an intensity of the high frequency component.

Figure 6:
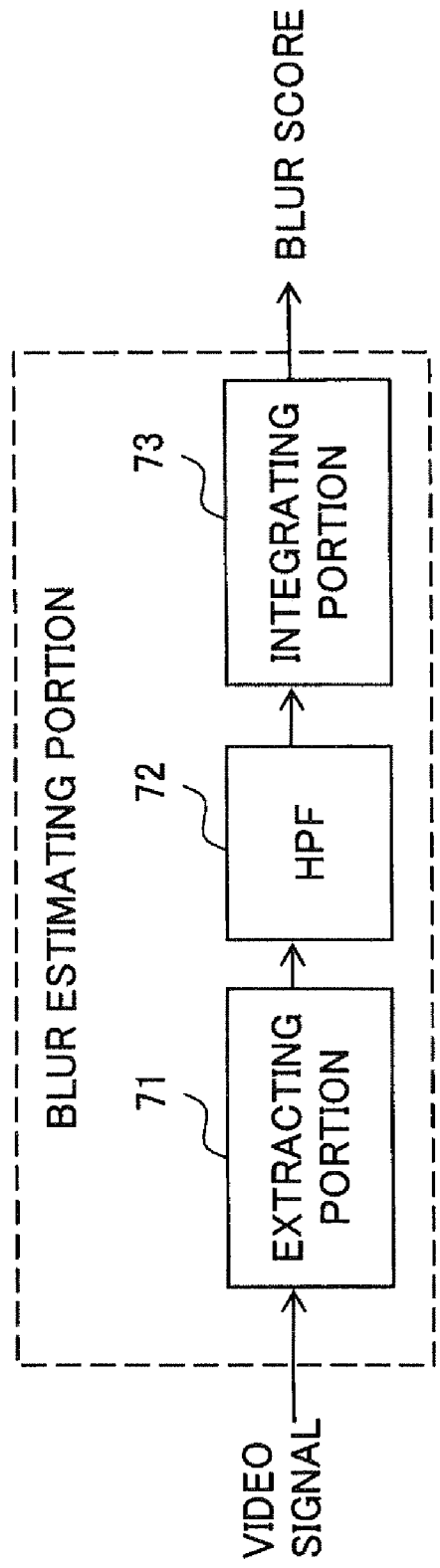
FIG. 6 is an internal block diagram of a blur estimating portion according to Example 1 of the present invention.

With reference to FIG. 6, a method of calculating a blur score of one observed low-resolution image will be described. FIG. 6 is an internal block diagram of a blur estimating portion that can be used as the blur estimating portion 52. The blur estimating portion of FIG. 6 includes an extracting portion 71, a high pass filter (HPF) 72 and an integrating portion 73.

The extracting portion 71 is supplied with the video signal of the observed low-resolution image. The extracting portion 71 extracts a luminance signal in an evaluation region defined in the observed low-resolution image from the video signal. The evaluation region is the entire region in the observed low-resolution image, for instance. However, a partial region in the observed low-resolution image (e.g., a main object region that will be described later in Example 5) may be set as the evaluation region. The HPF 72 extracts only a predetermined high frequency component in the luminance signal extracted by the extracting portion 71. For instance, the HPF 72 is formed as a Laplacian filter having a 3×3 filter size as the spatial domain filter illustrated in FIG. 7, and the Laplacian filter is used for each pixel in the evaluation region so as to perform spatial domain filtering. Then, output values corresponding to the filter characteristics of the Laplacian filter are obtained sequentially from the HPF 72. Note that the HPF 72 may be formed by a frequency domain filter, so that the high frequency components can be extracted on the frequency domain by using Fourier transformation.

The integrating portion 73 integrates amplitudes of the high frequency components extracted by the HPF 72 (i.e., absolute values of the output values of the HPF 72) and outputs the integrated value as the blur score. The blur score of a certain observed low-resolution image increases as the blur of the observed low-resolution image decreases.

When the resolution increasing process is performed on the three observed low-resolution images $L_1$ to $L_3$ for generating one high-resolution image, one of the three images $L_1$ to $L_3$ is set as a reference image to be a reference of the resolution increasing process, and other two are set as object images. The reference image can also be read as a reference frame or a reference frame image while the object image can also be read as an object frame or an object frame image. The displacement that is necessary for generating the high-resolution image is calculated with respect to the reference image. In addition, the initial high-resolution image is also generated based on the reference image. Therefore, image quality of the finally obtained high-resolution image depends largely on the reference image. Therefore, the reference image setting portion 53 performs the process of setting the reference image and the object image based on the blur score. Specifically, among the observed low-resolution images $L_1$ to $L_3$, the observed low-resolution image that is estimated to have the smallest blur is set as the reference image, and the other two observed low-resolution images are set as the object images. If the blur is small, the blur score becomes large. Therefore, the observed low-resolution image having the largest blur score is set as the reference image.

Here, a number of the observed low-resolution image corresponding to the reference image is represented by "a", and numbers of observed low-resolution images corresponding to the two object images are represented by "b" and "c". If the reference image is the image $L_1$, "a=1", "b=2" and "c=3" hold. If the reference image is the image $L_2$, "a=2", "b=1" and "c=3" hold. If the reference image is the image $L_3$, "a=3", "b=1" and "c=2" hold. After the reference image is set, the reference image setting portion 53 of FIG. 4 controls the order of the observed low-resolution images that a displacement detecting portion 54, an initial high-resolution image generating portion 55 and the super-resolution processing portion 57 should read, based on values of a, b and c. In other words, it controls the timing when image data should be read and the frame memory from which the image data should be read.

The displacement detecting portion 54 uses a representative point matching method, a block matching method, a gradient method or the like for calculating the displacement between two observed low-resolution images. Here, the calculated displacement has a so-called sub pixel resolution that is higher than a resolution corresponding to the pixel interval of the observed low-resolution image. In other words, the displacement is calculated by the smallest unit of a distance shorter than an interval between two neighboring pixels in the observed low-resolution image. The displacement is a two-dimensional quantity including a horizontal component and a vertical component, and it is also referred to as an amount of motion or a motion vector.

The displacement detecting portion 54 calculates the displacement between the reference image and each of the object images with respect to the reference image. Therefore, after the reference image is set, the displacement detecting portion 54 is first supplied with image data of observed low-resolution images $L_a$ and $L_b$ so that the displacement $V_{ab}$ between the observed low-resolution images $L_a$ and $L_b$ is calculated with respect to the observed low-resolution image $L_a$ (see FIG. 5). Next, the displacement detecting portion 54 is supplied with image data of observed low-resolution images $L_a$ and $L_c$ so that the displacement $V_{ac}$ between the observed low-resolution images $L_a$ and $L_c$ is calculated with respect to the observed low-resolution image $L_a$.

On the other hand, after the reference image is set, the initial high-resolution image generating portion 55 (hereinafter referred to as a generating portion 55 shortly) generates an initial high-resolution image $H_0$ based on the observed low-resolution image $L_a$ as the reference image (see FIG. 5). This generating process corresponds to the process in Step S11 of FIG. 3. The initial high-resolution image $H_0$ corresponds to an initial image of the high-resolution image to be generated finally. Hereinafter, the initial high-resolution image $H_0$ may be referred to as a high-resolution image $H_0$ or an image $H_0$ simply. For instance, a linear interpolation or a bicubic interpolation is used for generating an image $H_0$ in which the number of pixels in the horizontal direction and in the vertical direction of the observed low-resolution image $L_a$ is increased. Image data of the generated image $H_0$ is stored in the frame memory 64.

A selecting portion 56 of FIG. 4 selects one of the images generated by the generating portion 55 (i.e., the image $H_0$) and the image stored in the frame memory 64 and supplies image data of the selected image to the super-resolution processing portion 57. Immediately after the image $H_0$ is generated, the image $H_0$ is selected by the selecting portion 56. After the high-resolution image other than the image $H_0$ is generated by the super-resolution processing portion 57, the image stored in the frame memory 64 is selected by the selecting portion 56.

In addition, the super-resolution processing portion 57 is supplied with image data of the observed low-resolution images $L_a$, $L_b$ and $L_c$ from the frame memories 61 to 63. Based on the MAP method, the super-resolution processing portion 57 uses the image $H_0$, the observed low-resolution images $L_a$, $L_b$ and $L_c$, and the displacements $V_{ab}$ and $V_{ac}$ so as to determine the update value of the image $H_0$ via the generation of the estimated low-resolution image. This process corresponds to the processes in Steps S12 and S13 of the first time (see FIG. 3). Then, the image $H_0$ is updated by the update value so that the high-resolution image $H_1$ (hereinafter may be referred to as an image $H_1$ shortly) is generated. This corresponds to the process in Step S14 of the first time (see FIG. 3). Note that only the line shown as a thick line in FIG. 4 works significantly after the image $H_1$ is generated.

The image data of the generated image $H_1$ is overwritten and stored in the frame memory 64, and it is also supplied to the super-resolution processing portion 57 again via the selecting portion 56. The super-resolution processing portion 57 updates the image $H_1$ by the method similar to the method of generating the image $H_1$ from the image $H_0$, so that a high-resolution image $H_2$ (hereinafter may be referred to as an image $H_2$ shortly) is generated. The image data of the image $H_2$ is overwritten and stored in the frame memory 64. The process of generating the image $H_2$ from the image $H_1$ corresponds to the process in Steps S12 to S14 of the second time.

In this way, the super-resolution processing portion 57 performs the computing process repeatedly that includes the individual processes in Steps S12 to S14 for updating the high-resolution image so as to generate a new high-resolution image. Hereinafter, this computing process is referred to as a super-resolution computing process. When n is a natural number, the super-resolution computing process in n-th time generates the high-resolution image $H_n$ from the high-resolution image $H_{n-1}$. In the following description, it is supposed that n is an integer more than or equal to zero.

Figure 8:
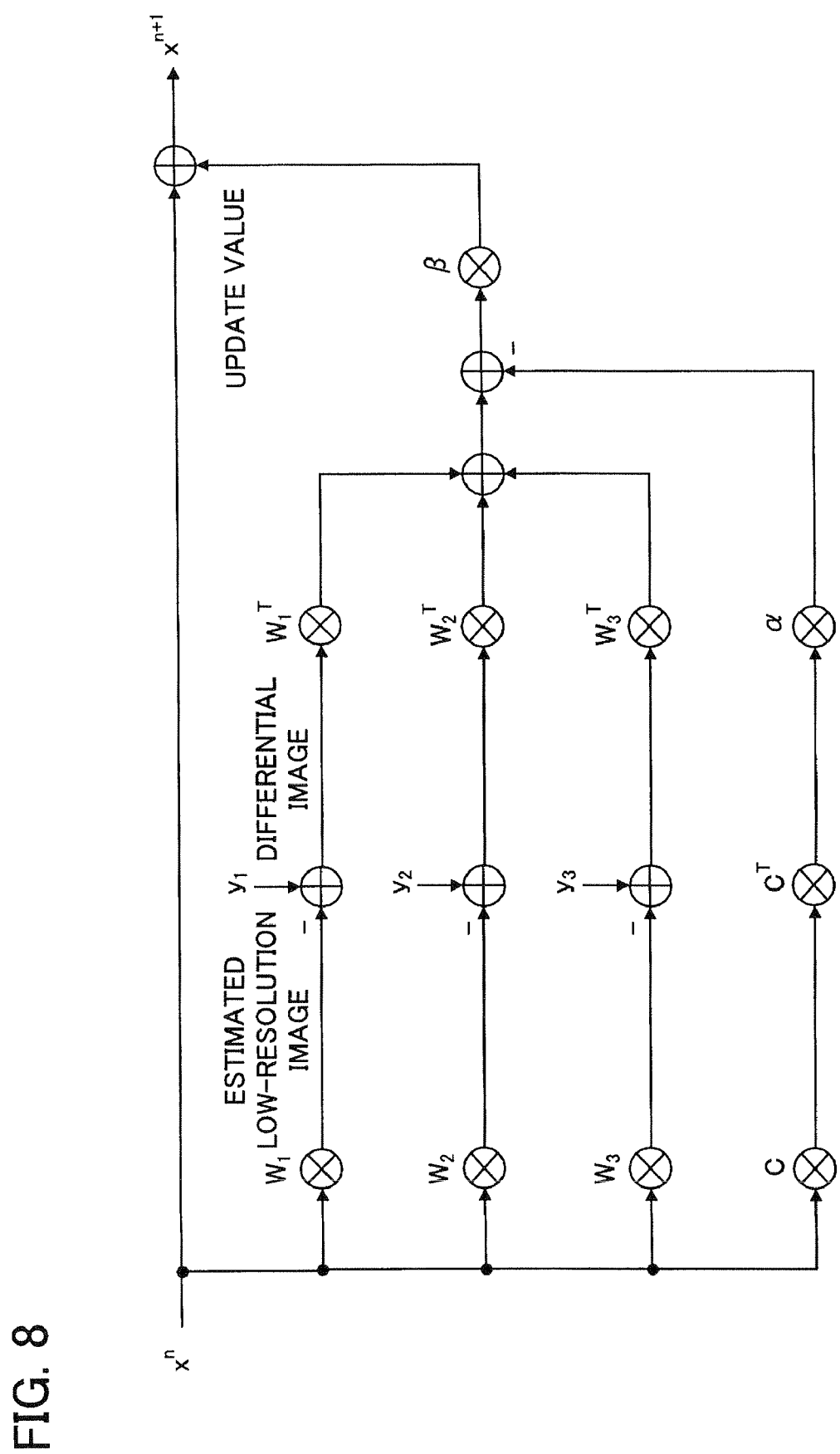
FIG. 8 is an internal block diagram of a super-resolution processing portion of FIG. 4.

FIG. 8 illustrates an internal block diagram of the super-resolution processing portion 57. Here, the high-resolution image $H_n$ expressed in a matrix is denoted by $x^n$, and the observed low-resolution image $L_k$ expressed in a matrix is denoted by $y_k$. In other words, for instance, the matrix $x^n$ includes pixel values of the pixels forming the high-resolution image $H_n$ arranged therein. Here, k can be a value of 1, 2 or 3.

Then, the matrix $x^{n+1}$ of the high-resolution image $H_{n+1}$ is calculated in accordance with the equation (A-1) below, so that the high-resolution image $H_{n+1}$ is generated. The second term in the right-hand side of the equation (A-1) indicates the update value of the high-resolution image $H_n$ to be calculated by the super-resolution processing portion 57. Here, $k_{NUM}$ denotes the number of observed low-resolution images, and $k_{NUM}=3$ in the present example. When the high-resolution image is updated based on the equation (A-1), an evaluation function I in the MAP method expressed in the equation (A-2) below is minimized. Here, x in the equation (A-2) denotes the high-resolution image expressed in a matrix when the super-resolution computing process has been performed for certain times.

$$x^{n+1} = x^n + \beta \left[ \sum_{k=1}^{k_{NUM}} \{W_k^T(y_k - W_k x^n)\} - \alpha C^T C x^n \right] \quad \text{(A-1)}$$

$$I = \sum_{k=1}^{k_{NUM}} \|y_k - W_k x\|^2 + \alpha \|Cx\|^2 \quad \text{(A-2)}$$

The estimated low-resolution image as an estimated image of the observed low-resolution image $L_k$ is expressed by the product of the matrix $W_k$ and the matrix $x^n$. Here, $W_k$ denotes a matrix for generating an estimated image of the observed low-resolution image $L_k$ from the high-resolution image $H_n$, and it is an image conversion matrix including the displacement calculated by the displacement detecting portion 54, a point spread function indicating an image blur generated by a resolution decreasing process from the high-resolution image to the low-resolution image, and down sampling from the high-resolution image to the low-resolution image. Further, $(y_k - W_k x^n)$ indicates a differential image between the observed low-resolution image $L_k$ and the estimated low-resolution image corresponding to the estimated image thereof. Note that the matrix with the superscript T indicates the transposed matrix of the original matrix. Therefore, for instance, $W_k^T$ indicates the transposed matrix of the matrix $W_k$.

In addition, C denotes a matrix for regularization, and α denotes a regularization parameter. The matrix C is set based on the precondition that a high-resolution image has little high frequency components, for instance, and it is formed by a Laplacian filter or the like expressed in a matrix. In addition, β denotes a parameter for controlling a feedback value.

When the number of repeating times of the super-resolution computing process in the super-resolution processing portion 57 reaches a set number of times, the latest high-resolution image obtained by the super-resolution computing process repeated the set number of times is output from the super-resolution processing portion 57 as the high-resolution image to be obtained finally. In addition, regardless of the number of repeating times of the super-resolution computing process, if the update value of the latest high-resolution image becomes small enough so that it can be decided that the update value has converged, the latest high-resolution image may be output from the super-resolution processing portion 57 as the high-resolution image to be obtained finally.

If an image having a large blur is set as the reference image, the accuracy of the calculated displacement is deteriorated. Since the super-resolution processing is aimed to perform the resolution increasing process based on the calculated displacement, the deterioration of accuracy of the displacement causes a deterioration of image quality of the high-resolution image. In addition, if an image having a large blur is set as the reference image, the image quality of an initial state of the high-resolution image to be obtained finally (i.e., the initial high-resolution image) becomes deteriorated, so that it becomes difficult to obtain an ideal high-resolution image. In the present example, since an image having a small blur is selected as the reference image, the image quality of the obtained high-resolution image is improved.

Figure 9A:
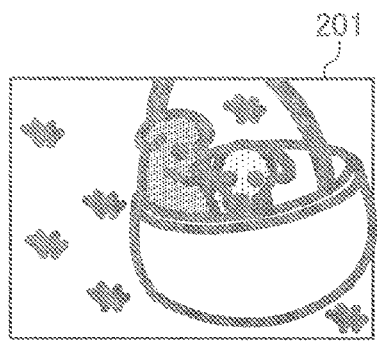
FIGS. 9A and 9B are diagrams for describing contents of experiment according to Example 1 of the present invention and are diagrams illustrating images having a large blur and a small blur, respectively, used in the experiment.
Figure 9B:
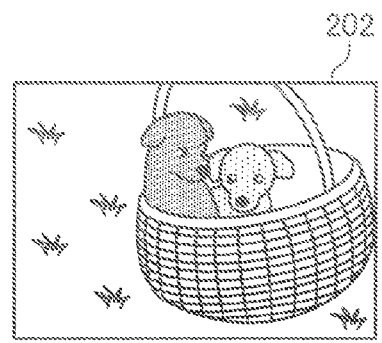

Using an image 201 having a relatively large blur as illustrated in FIG. 9A and an image 202 having a relatively small blur as illustrated in FIG. 9B, an experiment was carried out for confirming the effect of selecting an image having a small blur as the reference image. In this experiment, the resolution of the prepared ideal high-resolution image was reduced by a shrinking process with a reduction ratio of 50% so that three images were generated. Then, one of the three images was blurred intentionally so that the image had a large blur. Then, the two images having a small blur are handled as the two observed low-resolution images, and the one image having a large blur is handled as the one observed low-resolution image, so that the high-resolution image having a resolution twice higher than the observed low-resolution image is reconstructed by the super-resolution processing. The two observed low-resolution images having a small blur correspond to the image 202 in FIG. 9B, and the one observed low-resolution image of a large blur corresponds to the image 201 in FIG. 9A. In addition, a displacement (a position displacement) is generated between the two different observed low-resolution images.

Figure 10A:
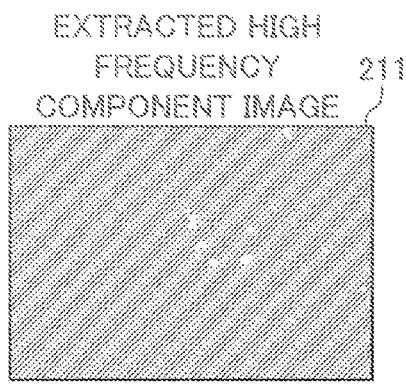
FIGS. 10A and 10B are diagrams illustrating extracted high frequency component images of the images illustrated in FIGS. 9A and 9B, respectively.
Figure 10B:
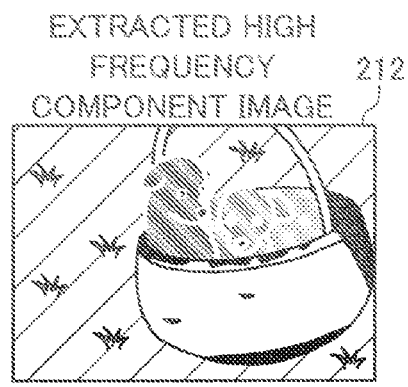

FIGS. 10A and 10B respectively illustrate extracted high frequency component images 211 and 212 of the images 201 and 202 that are obtained when the high pass filter (the Laplacian filter of FIG. 7) is applied to the images 201 and 202. In FIGS. 10A and 10B, a pixel having a smaller pixel value in the extracted high frequency component image is shown blackly. Because of a large blur included in the image 201, the entire of the extracted high frequency component image 211 is shown blackly. When the images 201 and 202 are supplied to the blur estimating portion of FIG. 6, the blur score (HPF integrated value) calculated with respect to the image 201 was approximately ½₀ of that calculated with respect to the image 202.

Figure 11:
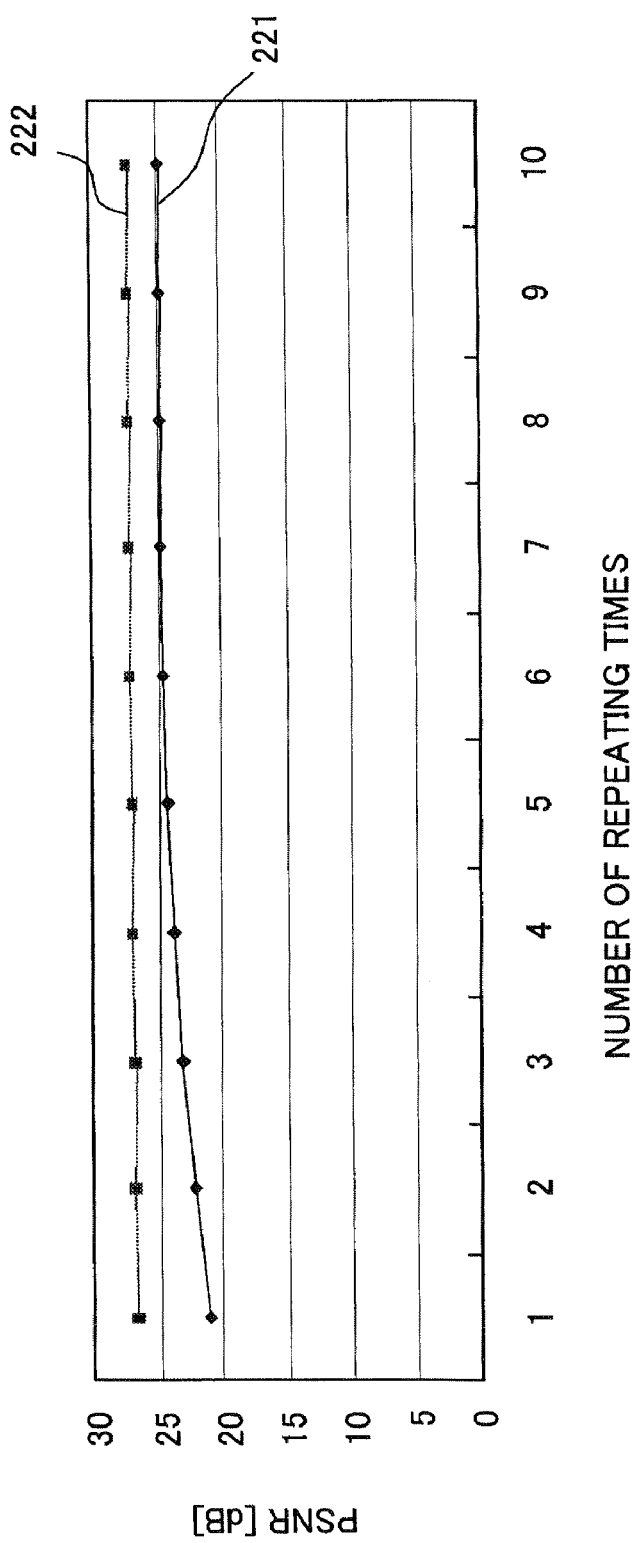
FIG. 11 is a diagram illustrating a relationship between the number of repeating times of a super-resolution computing process and a PSNR of a high-resolution image obtained by the experiment and an ideal high-resolution image according to the experiment of Example 1 of the present invention.

In the experiment, a peak signal to noise ratio (PSNR) between the high-resolution image output from the super-resolution processing portion 57 of FIG. 4 and the ideal high-resolution image was determined. As known well, the PSNR is an indicator of a similarity between contrasted images. The PSNR becomes higher as the similarity is higher. FIG. 11 is a graph illustrating a dependence of the PSNR on the number of repeating times of the super-resolution computing process. The line graph 221 in FIG. 11 indicates the dependence of the PSNR on the number of repeating times in the case where the observed low-resolution image having a large blur corresponding to the image 201 is set as the reference image. The line graph 222 in FIG. 11 indicates the dependence of the PSNR on the number of repeating times in the case where the observed low-resolution image having a small blur corresponding to the image 202 is set as the reference image. The PSNR in the case where the image having a small blur is set as the reference image is higher by approximately 2 dB than that in the case where the image having a large blur is set as the reference image. Also from this experiment, it is understood that there is advantage in selecting the image having a small blur as the reference image.

Figure 12:
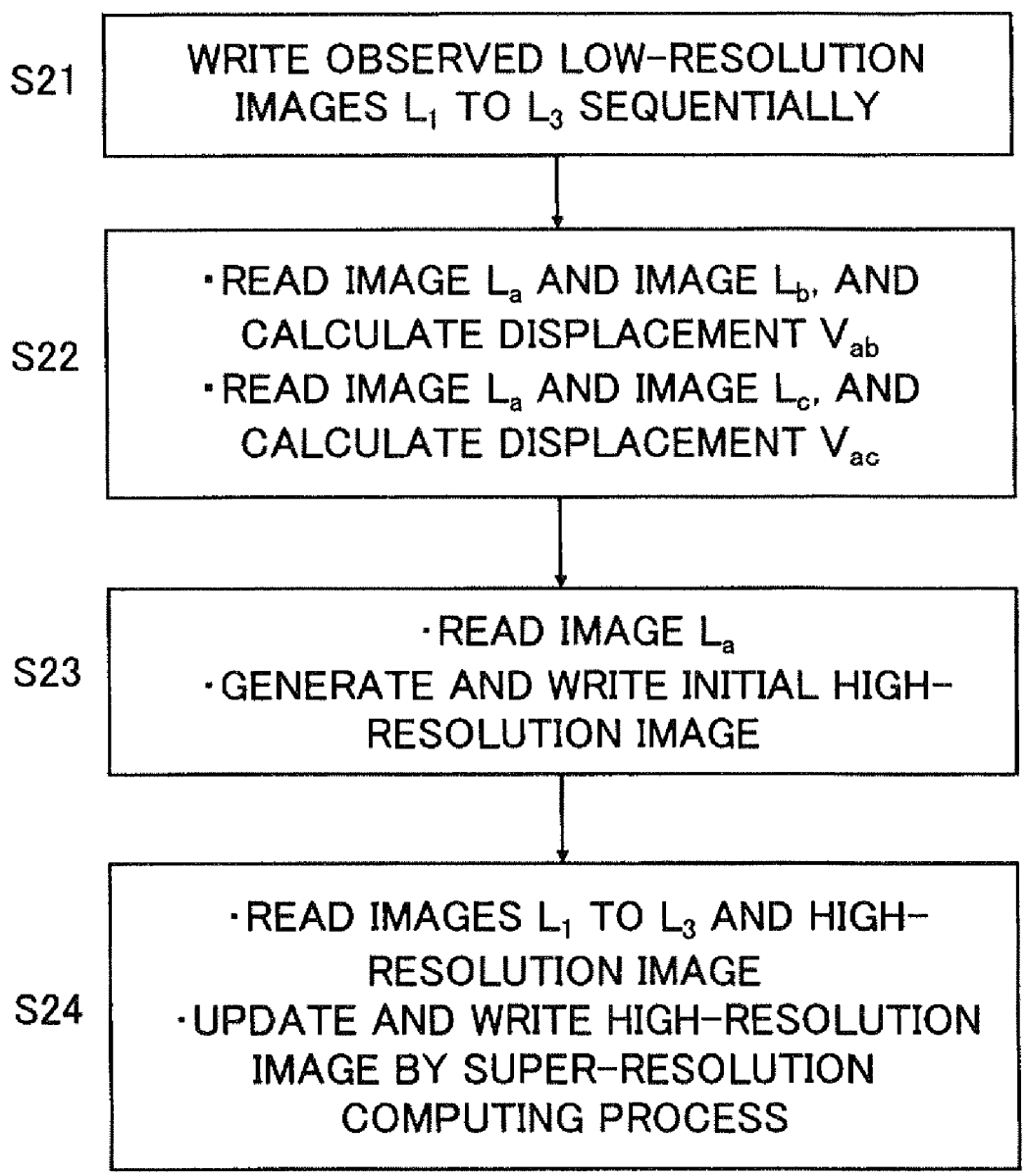
FIG. 12 is a flowchart illustrating a flow of an operation of the super-resolution processing, in which read and write timings of image data are particularly noted according to Example 1 of the present invention.

Further, the following description is a supplementary description of read and write timings of the image data with respect to the internal memory 17 including the frame memories 61 to 64. FIG. 12 should be referred to (FIG. 5 should also be referred). FIG. 12 is a flowchart illustrating a flow of an operation of the super-resolution processing in which the read and write timings of the image data are noted in particular.

First, in Step S21, the image data of the observed low-resolution images $L_1$ to $L_3$ are sequentially written in the internal memory 17. After the reference image is selected from the images $L_1$ to $L_3$, the process goes from Step S21 to Step S22. In Step S22, the displacement detecting portion 54 reads individual image data of the image $L_a$ as the reference image and the image $L_b$ as the object image from the internal memory 17 so as to calculate the displacement $V_{ab}$. Next, the individual image data of the image $L_a$ as the reference image and the image $L_c$ as the object image are read from the internal memory 17 so as to calculate the displacement $V_{ac}$. On the other hand, in Step S23, the generating portion 55 reads out the image data of the image $L_a$ from the internal memory 17 so as to generate the initial high-resolution image. The image data of the generated initial high-resolution image is written in the internal memory 17. After that, in the next Step S24, the individual image data of the images $L_1$ to $L_3$ and the current high-resolution image are read out from the internal memory 17. Thus, the high-resolution image is updated by the above-mentioned super-resolution computing process, and the image data of the updated high-resolution image is written in the internal memory 17. If the super-resolution computing process is performed repeatedly, the process of Step S24 is performed repeatedly. Note that the read out operation of the same image data from the internal memory 17 in Step S22, S23 and S24 may be performed simultaneously. For instance, the read out operation of the image data of the image $L_a$ in Step S22 and the same operation in Step S23 may be performed simultaneously.

As described above, if the displacement is calculated after the reference image is selected from the images $L_1$ to $L_3$, it is necessary to read out the image data of the observed low-resolution image from the internal memory 17 four times (for four images) at the stage of Step S22 (read out of the image data of the images $L_a$ and $L_b$ and read out of the image data of the images $L_a$ and $L_c$).

In order to contribute to reduction of the number of reading out operations, it is possible to perform the selection of the reference image and the calculation of the displacement in parallel. In this case, every time when the observed low-resolution image is obtained, the displacement between two observed low-resolution images neighboring on the time basis ($V_{12}$ and $V_{23}$ that will be described later) are calculated. After the reference image is set, the calculated displacement should be converted into the displacement between the reference image and each of the object images ($V_{ab}$ and $V_{ac}$ described above).

Specifically, the process may be performed as follows. After the image $L_1$ is obtained and the image data of the image $L_1$ is written in the internal memory 17, the image $L_2$ is obtained. Then, the image data of the image $L_2$ is written in the internal memory 17 and is also sent to the displacement detecting portion 54. At the same time, the image data of the image $L_1$ is read out from the internal memory 17 and is sent to the displacement detecting portion 54. (At this stage, the image data is read out for the first time.) Then, the displacement detecting portion 54 calculates the displacement $V_{12}$ between the image $L_1$ and the image $L_2$ with respect to the image $L_1$.

After that, the image $L_3$ is obtained. Then, the image data of the image $L_3$ is written in the internal memory 17 and is sent to the displacement detecting portion 54. At the same time, the image data of the image $L_2$ is read out from the internal memory 17 and is sent to the displacement detecting portion 54. (At this stage, the image data is read out for the second time.) Then, the displacement detecting portion 54 calculates the displacement $V_{23}$ between the image $L_2$ and the image $L_3$ with respect to the image $L_2$.

On the other hand, in parallel with the calculation of the displacements $V_{12}$ and $V_{23}$, the blur estimating portion 52 calculates the blur score with respect to the images $L_1$ to $L_3$, and the reference image is set based on the calculated blur score. The displacement detecting portion 54 converts the displacements $V_{12}$ and $V_{23}$ into the displacements $V_{ab}$ and $V_{ac}$ of the object image viewed from the reference image based on which of the images $L_1$ to $L_3$ is the set reference image. After the displacements $V_{ab}$ and $V_{ac}$ are determined by this conversion, the operation as described above is performed. For instance, if $V_{12}$=(0.5, 0.5) and $V_{23}$=(−0.25, −0.25) and if a=3, b=1 and c=2, the displacement $V_{ab}$ is determined in accordance with $V_{ab}=V_{31}=V_{32}+V_{21}=-V_{23}-V_{12}$=(0.25, 0.25)−(0.5, 0.5)=(−0.25, −0.25), and the displacement $V_{ac}$ is determined in accordance with $V_{ac}=V_{32}=-V_{23}$=(0.25, 0.25).

Thus, the selection process of the reference image and the calculation process of the displacements may be performed in parallel. In this case, although accuracy of detecting the displacements $V_{ab}$ and $V_{ac}$ is deteriorated a little due to the necessity of the conversion process of the displacements, the number of times of reading the image data can be reduced by two times so that power consumption can be reduced. Note that the simultaneous performance of the selection process of the reference image and the calculation process of the displacement can be applied also to other examples that will be described later.

EXAMPLE 2

Next, Example 2 will be described. The super-resolution portion 50 of FIG. 4 can be used also in Example 2, but the method of estimating the blur is different between Example 1 and Example 2. This difference will be described. The items that are not particularly described in Example 2 are the same as the items described in Example 1.

For convenience of description, the case where one high-resolution image is generated from four observed low-resolution images will be exemplified in Example 2. The four observed low-resolution images are four frame images that are shot continuously. These four observed low-resolution images are denoted by $L_1$, $L_2$, $L_3$ and $L_4$. It is supposed that the images $L_1$, $L_2$, $L_3$ and $L_4$ are shot in this order. Further, from the viewpoint that four observed low-resolution images are used for the super-resolution processing, the number of frame memories of the super-resolution portion 50 is changed from that of FIG. 4.

In Example 2, the displacement detecting portion 54 of FIG. 4 sequentially calculates the displacement between two observed low-resolution images neighboring on the time basis (so-called a motion vector between frames). In other words, it calculates the displacements $V_{12}$ and $V_{23}$ described above in Example 1, and the displacement $V_{34}$ between the image $L_3$ and the image $L_4$ with respect to the image $L_3$. The blur estimating portion 52 estimates a state of the hand vibration that is exerted on the image sensing apparatus 1 during the shooting period of the images $L_1$ to $L_4$ (i.e., a state of the shake of the image sensing apparatus 1) based on the calculated displacements $V_{12}$, $V_{23}$ and $V_{34}$. Then, based on a result of the estimation, it estimates a large and small relationship of the blur among the observed low-resolution images $L_1$ to $L_4$. The reference image setting portion 53 sets the observed low-resolution image corresponding to the minimum blur as the reference image based on a result of the estimation performed by the blur estimating portion 52, and it sets the other three observed low-resolution images as the object images.

Figure 13:
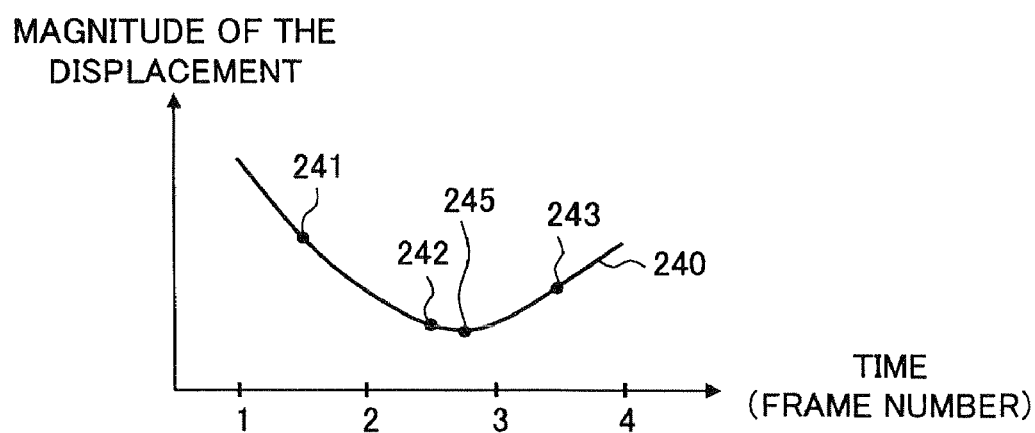
FIG. 13 is a diagram illustrating a manner in which a magnitude of the displacement varies according to Example 2 of the present invention.

With reference to FIG. 13 and others, it will be described more specifically. The curve 240 in FIG. 13 indicates a manner in which the magnitude of the displacement (the absolute value of the displacement) varies in the first concrete example. As to the graphs illustrated in FIG. 13 and FIG. 14 that will be referred to later, the horizontal axis represents time while the vertical axis represents the magnitude of the displacement. The horizontal axis also corresponds to a frame number. The frame numbers of the images $L_1$ to $L_4$ are 1 to 4, respectively.

The points 241, 242 and 243 respectively indicate the magnitudes of the displacements $V_{12}$, $V_{23}$ and $V_{34}$ in the first concrete example. The magnitudes of the displacements $V_{12}$, $V_{23}$ and $V_{34}$ as two-dimensional quantities are expressed by $|V_{12}|$, $|V_{23}|$ and $|V_{34}|$, respectively. The curve 240 is formed by using an interpolation method so that the points 241 to 243 exist on the curve 240. A trace like the curve 240 that is formed by connecting the magnitudes of the displacements $V_{12}$, $V_{23}$ and $V_{34}$ using the interpolation method is referred to as a hand vibration trace. It can be interpreted that the hand vibration trace indicates a time variation of an amplitude of the hand vibration that is exerted on the image sensing apparatus 1 during the shooting period of the images $L_1$ to $L_4$ (including the exposure periods thereof) (i.e., an amplitude of the shake of the image sensing apparatus 1 due to the hand vibration). If the inequality "$|V_{12}|>|V_{23}|<|V_{34}|$" holds like the example illustrated in FIG. 13, the hand vibration trace is drawn by a spline interpolation or the like.

Further, when the hand vibration trace is formed by using the interpolation method, it is possible to use not only the magnitudes of the displacements $V_{12}$, $V_{23}$ and $V_{34}$ but also the displacement $V_{01}$ between the image $L_1$ and the frame image $L_0$ that is shot just before the image $L_1$ is shot, and the displacement $V_{45}$ between the image $L_4$ and the frame image $L_5$ that is shot just after the image $L_4$ is shot.

The point 245 indicates the point where the magnitude of the displacement on the hand vibration trace 240 becomes the minimum. The blur estimating portion 52 specifies the frame number that is closest to the position of the minimum point 245 in the time direction as a minimum hand vibration frame number. Then, it estimates that the amplitude of the hand vibration that is exerted during the exposure period of the observed low-resolution image corresponding to the minimum hand vibration frame number is smaller than that of any of the other observed low-resolution images and that the blur of the observed low-resolution image corresponding to the minimum hand vibration frame number (the blur due to the hand vibration) is smaller than that of any of the other observed low-resolution images as a result.

The reference image setting portion 53 sets the observed low-resolution image corresponding to the minimum hand vibration frame number as the reference image, and it sets other three observed low-resolution images as the object images. In the example of FIG. 13, the point 245 exists between the point 242 and the point 243. Therefore, the minimum hand vibration frame number is "3", and the observed low-resolution image corresponding to the minimum hand vibration frame number is $L_3$. Accordingly, the image $L_3$ is set as the reference image while the images $L_1$, $L_2$ and $L_4$ are set as the object images.

The method of determining the minimum hand vibration frame number in the case where the inequality "$|V_{12}|>|V_{23}|<|V_{34}|$" does not hold will be described. The hand vibration trace 250 in FIG. 14 indicates a manner in which the magnitude of the displacement varies in the second concrete example. The points 251, 252 and 253 respectively indicate the magnitudes of the displacements $V_{12}$, $V_{23}$ and $V_{34}$ in the second concrete example. The hand vibration trace 250 is formed by connecting the points 251 to 253 by using the interpolation method.

Figure 14:
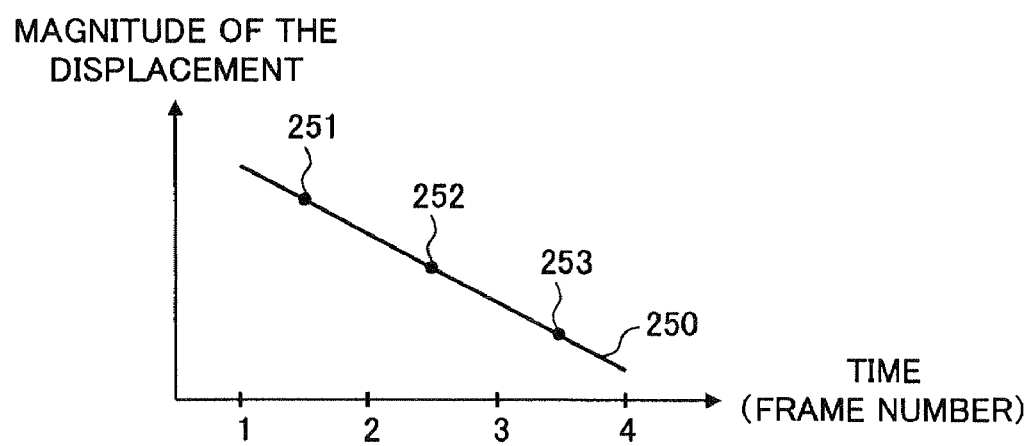
FIG. 14 is a diagram illustrating a manner in which a magnitude of the displacement varies according to Example 2 of the present invention.

Since the inequality "$|V_{12}|>|V_{23}|>|V_{34}|$" holds in the second concrete example corresponding to FIG. 14, it is understood that the amplitude of the hand vibration that was exerted on the image sensing apparatus 1 in the shooting period of the images $L_1$ to $L_4$ (including the exposure periods thereof) was decreasing gradually. In this case, it is determined that the minimum hand vibration frame number is "4". On the contrary, if the inequality "$|V_{12}|<|V_{23}|<|V_{34}|$" holds, it is determined that the minimum hand vibration frame number is "1". In addition, if the inequality "$|V_{12}|<|V_{23}|>|V_{34}|$" and the inequality "$|V_{12}|>|V_{34}|$" hold, the minimum hand vibration frame number is determined to be "4". If the inequality "$|V_{12}|<|V_{23}|>|V_{34}|$" and the inequality "$|V_{12}|<|V_{34}|$" hold, the minimum hand vibration frame number is determined to be "1". The process content after the minimum hand vibration frame number is determined is as described above.

Note that it is possible to determine the minimum hand vibration frame number as follows. A sum of the magnitudes of the displacements $V_{01}$ and $V_{12}$, a sum of the magnitudes of the displacements $V_{12}$ and $V_{23}$, a sum of the magnitudes of the displacements $V_{23}$ and $V_{34}$, and a sum of the magnitudes of the displacements $V_{34}$ and $V_{45}$ are determined in association with the frame numbers 1, 2, 3 and 4, respectively. The frame number corresponding to a minimum value among the four sums is determined to be the minimum hand vibration frame number.

EXAMPLE 3

The method of estimating the blur described above in Example 1 or Example 2 is merely an example, and other methods may be used for estimating the blur. Example 3 will be described as an example showing a variation of the method of estimating the blur. Example 3 is performed in combination with Example 1.

For instance, it is possible to estimate the blur based on a variance of a histogram of luminance values in the observed low-resolution image. If this method is used, the blur estimating portion 52 of FIG. 4 extracts a luminance signal of pixels in the observed low-resolution image so as to generate the histogram of the luminance value (i.e., values of the luminance signal) of the observed low-resolution image. Then, the variance of the histogram is calculated as the blur score. The generation of the histogram and the calculation of the variance are performed for each of the observed low-resolution images. Note that the luminance signal forming the histogram may be extracted from the entire region of the observed low-resolution image or from a partial region of the observed low-resolution image.

Since the three observed low-resolution images $L_1$ to $L_3$ are three frame images that are shot successively, they have basically the same composition. Among the images having the same composition, luminance between neighboring pixels is smoothed more as the hand vibration generated in the exposure period is larger. In this case, a ratio of pixels having the intermediate gradation increases so that the distribution of the luminance values in the histogram is concentrated in the intermediate gradation. Since the variance of the histogram decreases so that the blur score decreases as the degree of the above-mentioned smoothing increases, it can be estimated that the larger the blur score, the smaller the blur of the observed low-resolution image corresponding thereto is. Therefore, the reference image setting portion 53 of FIG. 4 sets the observed low-resolution image corresponding to the largest blur score as the reference image among the blur scores of the observed low-resolution images $L_1$ to $L_3$ based on the variance of the histogram, and it sets the other two observed low-resolution images as the object image.

Figure 15B:
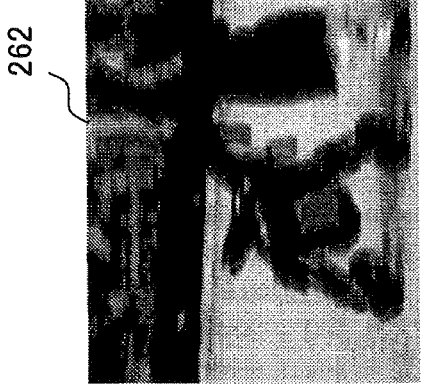
FIGS. 15A and 15B are diagrams for describing a blur estimating method according to Example 3 of the present invention and are diagrams illustrating images having a small blur and a large blur, respectively.
Figure 15A:
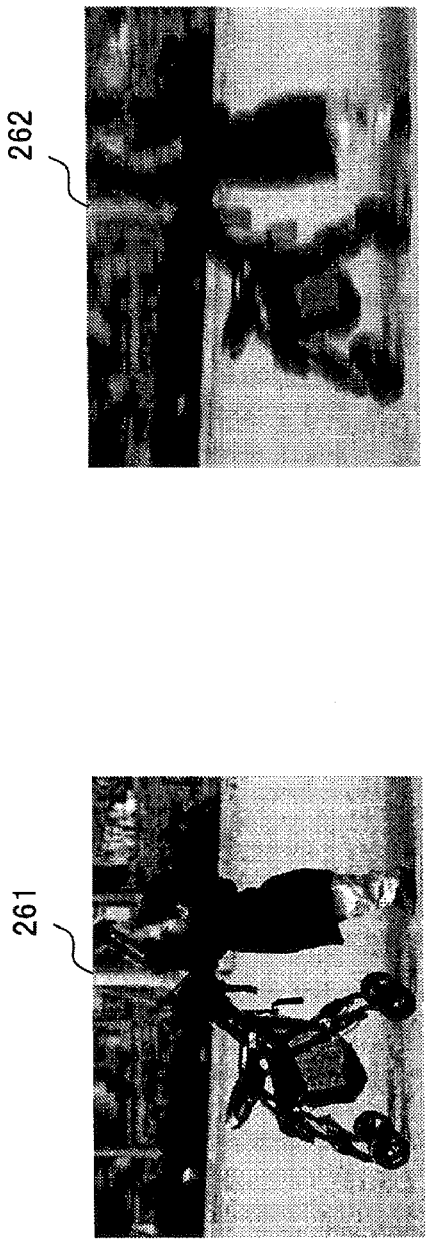
Figure 16B:
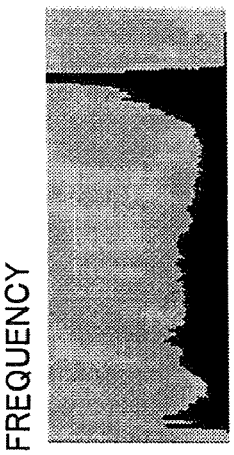
FIGS. 16A and 16B are diagrams illustrating luminance histograms of the images illustrated in FIGS. 15A and 15B, respectively.
Figure 16A:
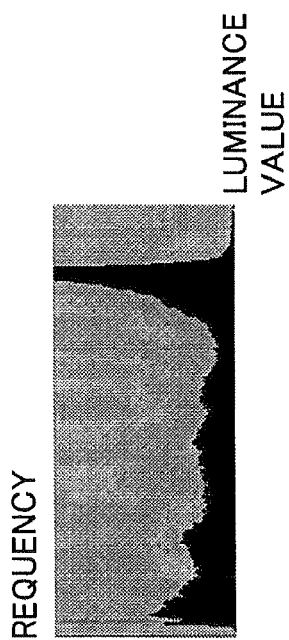

As an example of the observed low-resolution image, FIG. 15A illustrates the image 261 while FIG. 15B illustrates the image 262. The image 261 is a clear image while the image 262 includes a large blur because of a large hand vibration that occurred in the exposure period of the image 262. In addition, FIGS. 16A and 16B illustrate histograms generated for the images 261 and 262, respectively. In comparison with the histogram of the image 261 (see FIG. 16A), there is a concentration of distribution in the intermediate gradation as for the histogram of the image 262 (see FIG. 16B). This concentration makes the variance small.

Other than that, any method of estimating the blur of the image can be used. For instance, it is possible to use the method described in JP-A-11-27574 for estimating the blur of the observed low-resolution image. In this case, Fourier transformation of the noted observed low-resolution image is used for generating a converted image on the two-dimensional frequency domain, so that the converted image is projected on a circle having its center at the origin of the frequency coordinate. Then, the blur of the noted observed low-resolution image is estimated from the projection data. Note that the "amplitude of the hand vibration" in JP-A-11-27574 corresponds to the blur.

EXAMPLE 4

Figure 17:
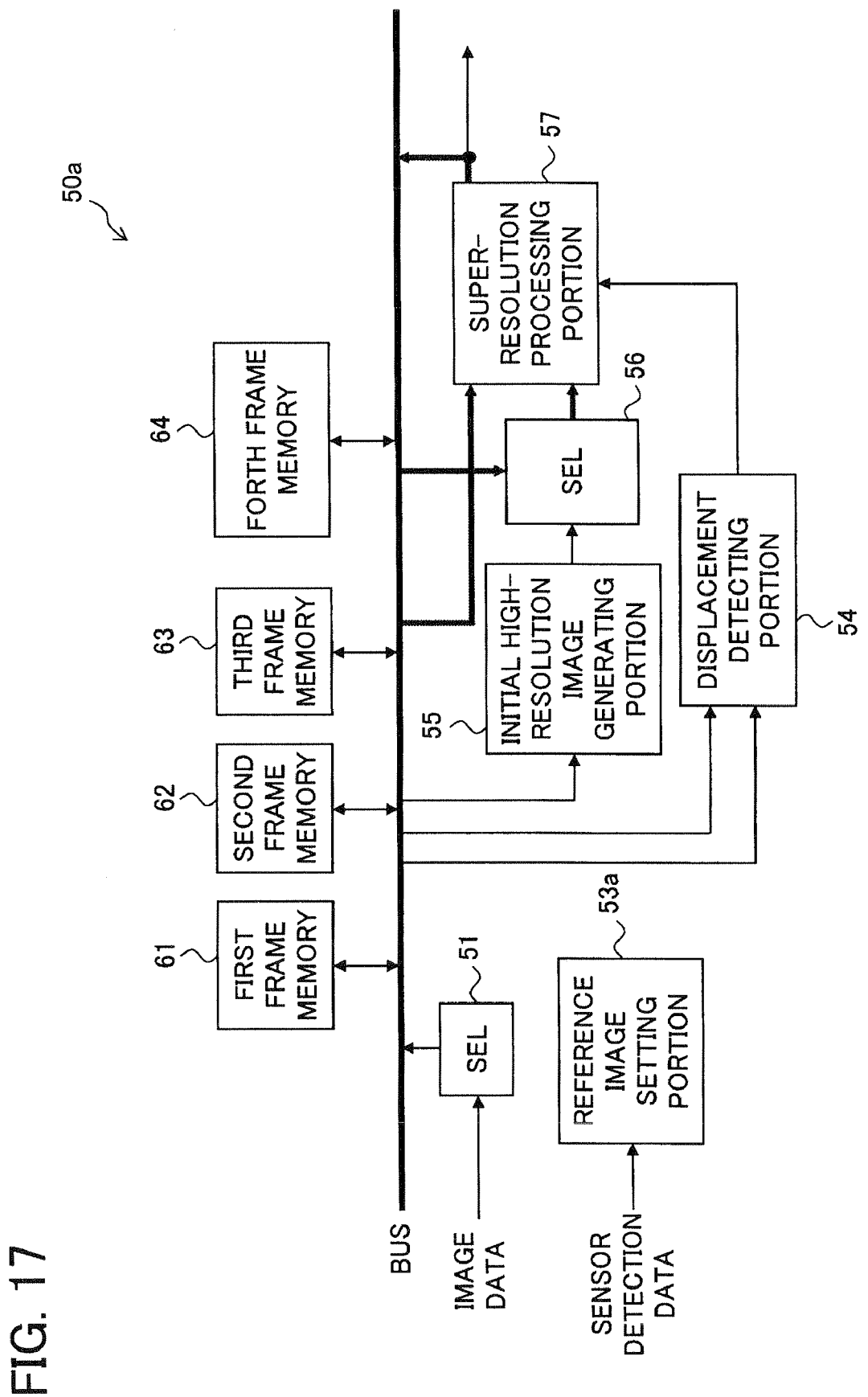
FIG. 17 is an internal block diagram of a super-resolution portion for performing the super-resolution processing according to Example 4 of the present invention.

Next, Example 4 will be described. FIG. 17 is an internal block diagram of a super-resolution portion 50a according to Example 4. Individual portions denoted by reference numerals 51, 54 to 57 and 61 to 64 disposed in the super-resolution portion 50a are the same as those in FIG. 4. A function of a reference image setting portion 53a disposed in the super-resolution portion 50a is realized by the CPU 23 or the video signal processing portion 13 in FIG. 1. Except for the different method of setting the reference image, the super-resolution portion 50a is similar to the super-resolution portion 50 according to Example 1 (FIG. 4). Therefore, in the following, a method of setting the reference image according to Example 4 will be described. In Example 4, similarly to Example 1, it is supposed that one high-resolution image is generated from the three observed low-resolution images $L_1$ to $L_3$.

In Example 4, the image sensing apparatus 1 is equipped with a sensor portion 75 of FIG. 18. The reference image setting portion 53a sets the reference image from the observed low-resolution images $L_1$ to $L_3$ based on sensor detection data output from the sensor portion 75. The sensor portion 75 detects a shake of the image sensing apparatus 1 (a shake of the body of the image sensing apparatus 1) due to a hand vibration or the like. Specifically, the sensor portion 75 includes an angular velocity sensor 75A for detecting an angular velocity of the image sensing apparatus 1 in the yaw direction (horizontal direction) so as to output a signal indicating a result of the detection, and an angular velocity sensor 75B for detecting an angular velocity of the image sensing apparatus 1 in the pitch direction (vertical direction) so as to output a signal indicating a result of the detection. The output signals of the angular velocity sensors 75A and 75B are output as the sensor detection data.

The sensor detection data indicates an amplitude and a direction of the shake of the image sensing apparatus 1 (shake of the body of the image sensing apparatus 1). The reference image setting portion 53a sets the reference image based on the sensor detection data in the exposure period of each of the observed low-resolution images $L_1$ to $L_3$. Specifically, an amplitude $Q_1$ of the shake of the image sensing apparatus 1 during the exposure period of the image $L_1$, an amplitude $Q_2$ of the shake of the image sensing apparatus 1 during the exposure period of the image $L_2$, and an amplitude $Q_3$ of the shake of the image sensing apparatus 1 during the exposure period of the image $L_3$ are determined from the sensor detection data during the exposure period of each of the images $L_1$ to $L_3$. The observed low-resolution image corresponding to the minimum amplitude among the amplitudes $Q_1$ to $Q_3$ is set as the reference image, and other two observed low-resolution images are set as the object images. For instance, if the inequality "$Q_1 > Q_3 > Q_2$" holds as illustrated in FIG. 19, the image $L_2$ is set as the reference image while the images $L_1$ and $L_3$ are set as the object images.

The amplitude $Q_1$ indicates a length of the trace of, for example, a point image formed by light from a point light source that is stationary in the real space, which is drawn on the image $L_1$ by the shake of the image sensing apparatus 1 during the exposure period of the image $L_1$ (or indicates a distance between the start point and the end point of the trace). The same is true for the amplitudes $Q_2$ and $Q_3$.

Note that it is possible to think that the super-resolution portion 50a includes the blur estimating portion (not illustrated). In this case, the blur estimating portion in the super-resolution portion 50a determines the amplitudes $Q_1$ to $Q_3$ of the shake of the image sensing apparatus 1 from the sensor detection data in the exposure period of each of the images $L_1$ to $L_3$. Then, it estimates that the larger the amplitude of the shake of the image sensing apparatus 1, the larger the blur of the corresponding observed low-resolution image is. Then, it supplies a result of the estimation to the reference image setting portion 53a. Based on this result of the estimation, the reference image setting portion 53a can set the reference image. Therefore, if the inequality "$Q_1 > Q_3 > Q_2$" holds for instance, it is estimated that the blur of the image $L_1$ is largest while the blur of the image $L_2$ is smallest among the blurs of the images $L_1$ to $L_3$. The estimation result is supplied to the reference image setting portion 53a so that the image $L_2$ is set as the reference image while the images $L_1$ and $L_3$ are set as the object images.

In addition, although the sensor portion 75 is made up of the angular velocity sensor in the example described above, sensor portion 75 may be made up of a sensor other than the angular velocity for detecting a physical quantity indicating the shake of the image sensing apparatus 1. For instance, the sensor portion 75 may be made up of an acceleration sensor for sensing the acceleration of the image sensing apparatus 1 or an angular acceleration sensor for sensing the angular acceleration of the image sensing apparatus 1.

Further, when the image $L_1$ is shot, the image data indicating luminance and color of the image $L_1$ as well as the sensor detection data during the exposure period of the image $L_1$ is obtained, and these data are associated with each other and recorded in the external memory 18 (see FIG. 1) as necessary. If these data concerning the image $L_1$ are recorded in the external memory 18, one image file including a main body region and a header region is disposed in the external memory 18, so that the image data is stored in the main body region while the sensor detection data is stored in the header region of the image file, for instance. The sensor detection data of the image $L_1$ can be considered to be information accompanying the image data of the image $L_1$ for indicating shooting conditions of the image $L_1$. The same is true for an image other than the image $L_1$ (e.g., $L_2$ or the like).

In this specification, as illustrated in FIG. 20, the information including the image data and the sensor detection data is referred to as image information. The image information of the image $L_1$ indicates characteristics of the image $L_1$ including the shooting conditions of the image $L_1$ (the same is true for the image $L_2$ and the like).

EXAMPLE 5

Next, Example 5 will be described. The larger the size of the main object on the image noted by the photographer, the more in detail the main object can be expressed on the image. Therefore, it is desired to provide the user including the photographer with an image on which the main object is expressed more largely. On the other hand, the high-resolution image obtained by the super-resolution processing is generated with respect to the observed low-resolution image as the reference image. Therefore, if a size of the main object on the reference image is relatively large, a size of the main object on the high-resolution image is also relatively large. Considering this fact, the observed low-resolution image on which the main object is expressed more largely is set as the reference image in Example 5.

Figure 21:
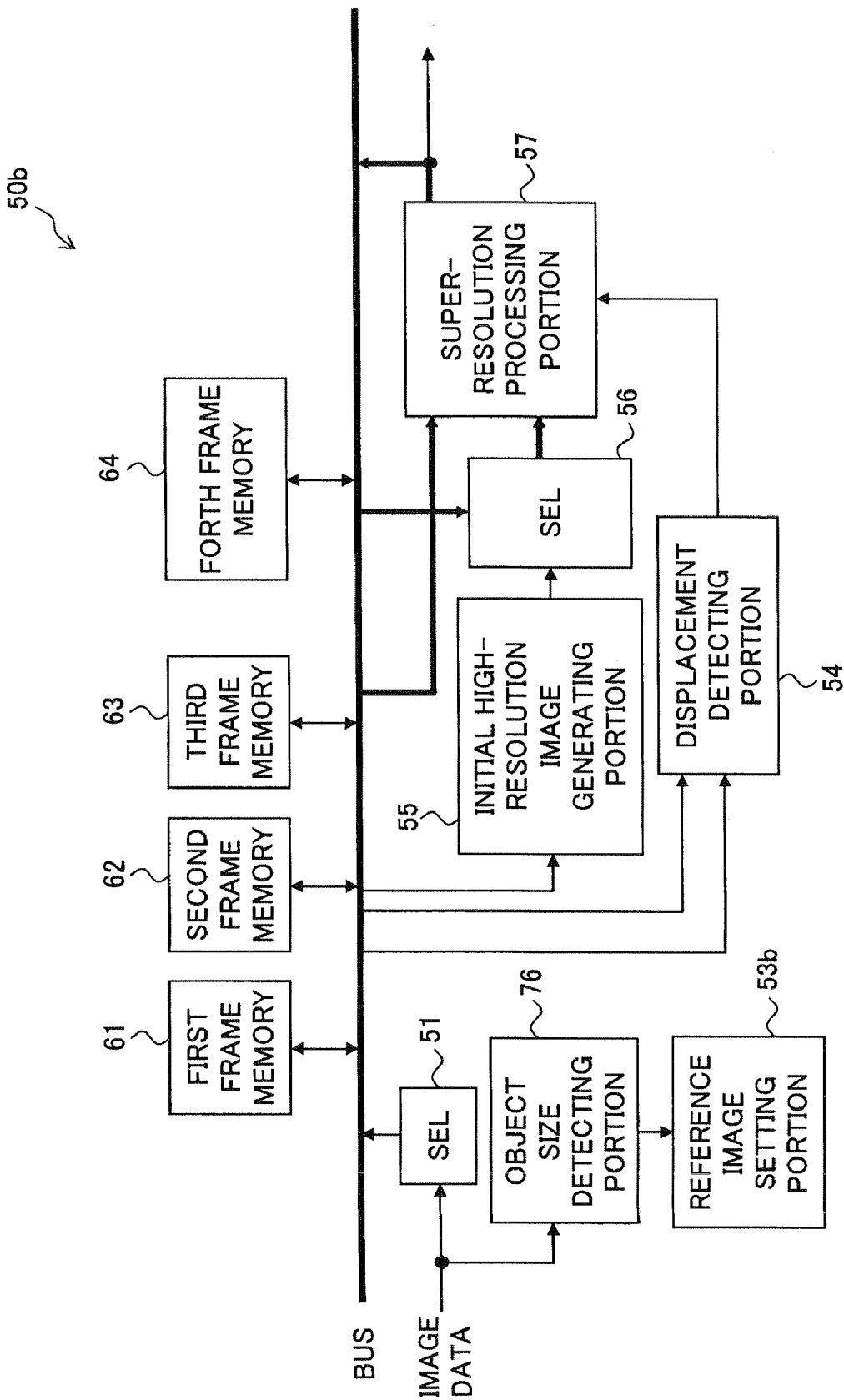
FIG. 21 is an internal block diagram of the super-resolution portion for performing the super-resolution processing according to Example 5 of the present invention.

FIG. 21 is an internal block diagram of a super-resolution portion 50b in Example 5. The individual portions denoted by the reference numerals 51, 54 to 57 and 61 to 64 disposed in the super-resolution portion 50b are the same as those in FIG. 4. The functions of the reference image setting portion 53b and an object size detecting portion 76 disposed in the super-resolution portion 50b are realized by the CPU 23 or the video signal processing portion 13 of FIG. 1. Except for the different method of setting the reference image, the super-resolution portion 50b is similar to the super-resolution portion 50 according to Example 1 (FIG. 4). Therefore, in the following, functions of the reference image setting portion 53b and the object size detecting portion 76 concerning the setting of the reference image will be described. In Example 5, similarly to Example 1, it is supposed that one high-resolution image is generated from the three observed low-resolution images $L_1$ to $L_3$.

The object size detecting portion 76 detects a size of the main object on the observed low-resolution image based on the image data of the observed low-resolution image for each of the observed low-resolution images. The reference image setting portion 53b sets the observed low-resolution image having the largest size of the main object as the reference image and sets the other two observed low-resolution images as the object images among the observed low-resolution images $L_1$ to $L_3$.

With reference to a concrete example, the method of detecting the object size detecting portion 76 will be described. First, as a first detecting method, the case where the object size detecting portion 76 is adapted to be capable of performing a face detection process will be described. The face detection process is a process for extracting an image region including image data of a human face as a face region from the entire image region of the observed low-resolution image based on the image data of the observed low-resolution image. In the first detecting method, the object size detecting portion 76 performs the face detection process on each of the images $L_1$ to $L_3$ so as to extract the face region from each of the images $L_1$ to $L_3$. A size of the face region increases as a size of the face included in the face region increases.

Figure 22:
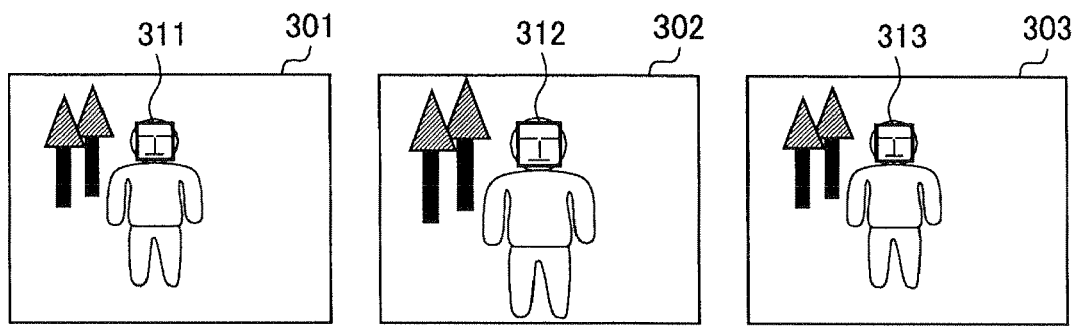
FIG. 22 is a diagram illustrating a first example of three observed low-resolution images according to Example 5 of the present invention.

In the first detecting method, the object size detecting portion 76 sends the face detection result including information indicating a size of the face region to the reference image setting portion 53b. Based on the face detection result, the reference image setting portion 53b set the observed low-resolution image as the reference image, in which the largest face region is extracted. For instance, if the images 301 to 303 in FIG. 22 are obtained as the images $L_1$ to $L_3$ while the face regions 311 to 313 are extracted from the images 301 to 303, and if a size of the face region 312 is larger than the face regions 311 and 313 on the image, the image $L_2$ corresponding to the image 302 and the face region 312 is set as the reference image. In the example described above, it is considered that the human face or the human itself is the main object.

Further, one of causes that images having uneven sizes of face regions like images 301 to 303 are obtained is considered to be that the image sensing apparatus 1 moves along the shooting direction (i.e., moves back and forth) during the shooting period of the images 301 to 303. In this case, a linear conversion (so-called electronic zoom) is performed on the entire of the images 301 and 303 so that the images 301 to 303 have the same size of the face region. Then, the images 30 and 303 after the linear conversion can be used as the object images for performing the super-resolution processing.

However, it is considered that not the image sensing apparatus 1 but the human corresponding to the face regions 311 to 313 moves along the shooting direction during the shooting period of the images 301 to 303. Also in this case, the images 301 and 303 after the above-mentioned linear conversion can be used as the object images for performing the super-resolution processing. However, if the human moves, a size of the background region does not match between the image 302 as the reference image and the image 301 or 303 after the linear conversion although a size of the face region matches therebetween. If the super-resolution processing is performed using the images having uneven sizes of the background region, a double image may occur in the background region.

On the other hand, if such a mismatch occurs, reliability of the displacement calculation performed by the displacement detecting portion 54 is deteriorated. Therefore, if the reliability is calculated together with the displacement, the occurrence of the mismatch can be detected. For instance, as known well, it is possible to detect the above-mentioned reliability from data generated when the displacement is calculated (e.g., a value of sum of squared difference (SSD) that is calculated when the displacement is determined by the block matching method).

Therefore, if the above-mentioned mismatch is detected, it is decided that the human has moved. Then, the image regions in the images 301 and 303 after the linear conversion, which is the image region other than the face region (or other than an image region including the image data of the human), should not be used for the super-resolution processing. For instance, only the entire image region of the image 302 and the face regions 311 and 313 of the images 301 and 303 after the linear conversion are used for generating the high-resolution image. Thus, the face region in the high-resolution image is generated from the face region of the three low-resolution images while the part other than the face region in the high-resolution image is generated from only the image 302. It is sufficiently useful because the resolution increasing process of the face as the main object can be realized. Note that the displacement between the face region 311 of the image 302 and the face region 311 or 313 of the image 301 or 303 after the linear conversion, which will be necessary for generating the high-resolution image, can be determined from positions of the face regions determined when the face detection process is performed. This method in which a part of the image region in the observed low-resolution image after the linear conversion is not used for the super-resolution processing can be applied to the second detecting method that will be described later.

A second detecting method performed by the object size detecting portion 76 will be described. In the second detecting method, the object size detecting portion 76 sets the main object region for each of the observed low-resolution images. The main object region is a part image region of the observed low-resolution image and is the image region that is estimated to include the image data of the main object. For instance, considering that the main object is usually located at the middle portion of the image with a high probability, a preset image region located at the middle portion of the observed low-resolution image may be used as the main object region. Alternatively, the AF evaluation region that will be described later in Example 7 may be used as the main object region. Still alternatively, the image region including image data of an object that is focused may be used as the main object region. A position of the image region including image data of an object that is focused can be determined from high frequency components of the observed low-resolution image.

Figure 23:
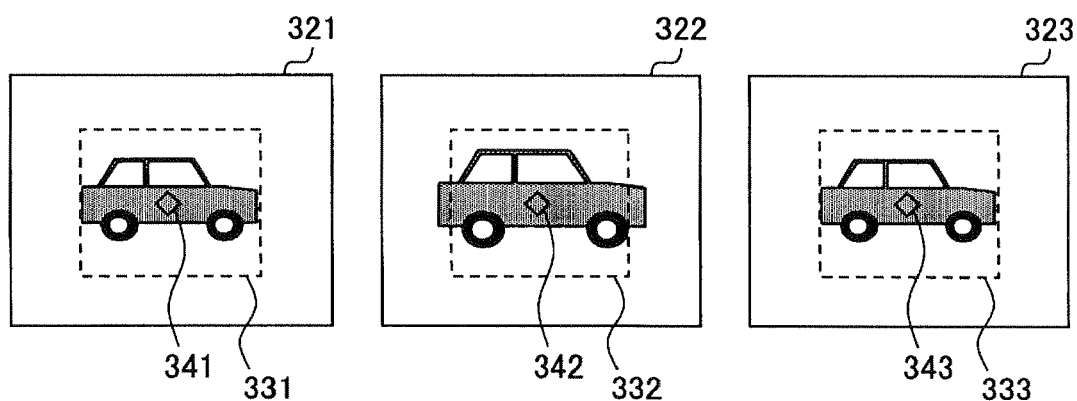
FIG. 23 is a diagram illustrating a second example of three observed low-resolution images according to Example 5 of the present invention.

Now it is supposed that the images 321 to 323 of FIG. 23 are obtained as the images $L_1$ to $L_3$ and that the main object regions 331 to 333 are set for the images 321 to 323. The object size detecting portion 76 sets reference regions 341 to 343 at the middle portion of the main object regions 331 to 333, respectively. A position and a size of the main object region as well as a position and a size of the reference region are the same among the images 321 to 323.

The object size detecting portion 76 determines a color in the reference region 341 of the image 321, a color in the reference region 342 of the image 322, and a color in the reference region 343 of the image 323 as first to third reference colors based on the image data of the images 321 to 323. The color in the reference region 341 is, for instance, an average color of the pixels included in the reference region 341 (the same is true for the color in the reference region 342 and the color in the reference region 343). If the image data is expressed with a signal of the RGB format, the first reference color can be obtained from R, G and B signals as color signals of each pixel included in the reference region 341. If the image data is expressed with a signal of the YUV format, the first reference color can be obtained from U and V signals as color difference signals of each pixel included in the reference region 341 (the same is true for the second and the third reference colors). As to a certain pixel, R, G and B signals indicate intensities of red, green and blue colors of the pixel. Note that the first to the third reference colors may be set to be the same color. In this case, the first to the third reference colors may be set to be a color in the reference region 341, 342 or 343.

The object size detecting portion 76 counts the number of pixels included in the main object region that are the same or similar to the reference color for each of the observed low-resolution images, so as to detect a size of the main object on the observed low-resolution image.

Specifically, it performs the following process for each of the observed low-resolution images. The position of the reference color in the RGB color space is set as a reference position while a position of color of each pixel included in the main object region in the RGB color space is detected. The Euclidean distances between the former position (reference position) and the latter positions are determined. Then, the number of pixels having the Euclidean distance smaller than or equal to a predetermined threshold value $D_{TH}$ among pixels in the main object region is detected as a size of the main object. In the case illustrated in FIG. 23, the above-mentioned number counted for the image $L_2$ becomes larger than those counted for the images $L_1$ and $L_3$. As a result, the image $L_2$ is set as the reference image.

According to Example 5, it is possible to generate the high-resolution image that is preferable for the user because the main object is expressed largely therein.

EXAMPLE 6

Next, Example 6 will be described. If an image that is not preferable for the user because of closed eyes or an image with a bad facial expression is selected as the reference image, the high-resolution image does not become a preferable image, too. Therefore, setting of the reference image is performed considering the facial state in Example 6.

Figure 24:
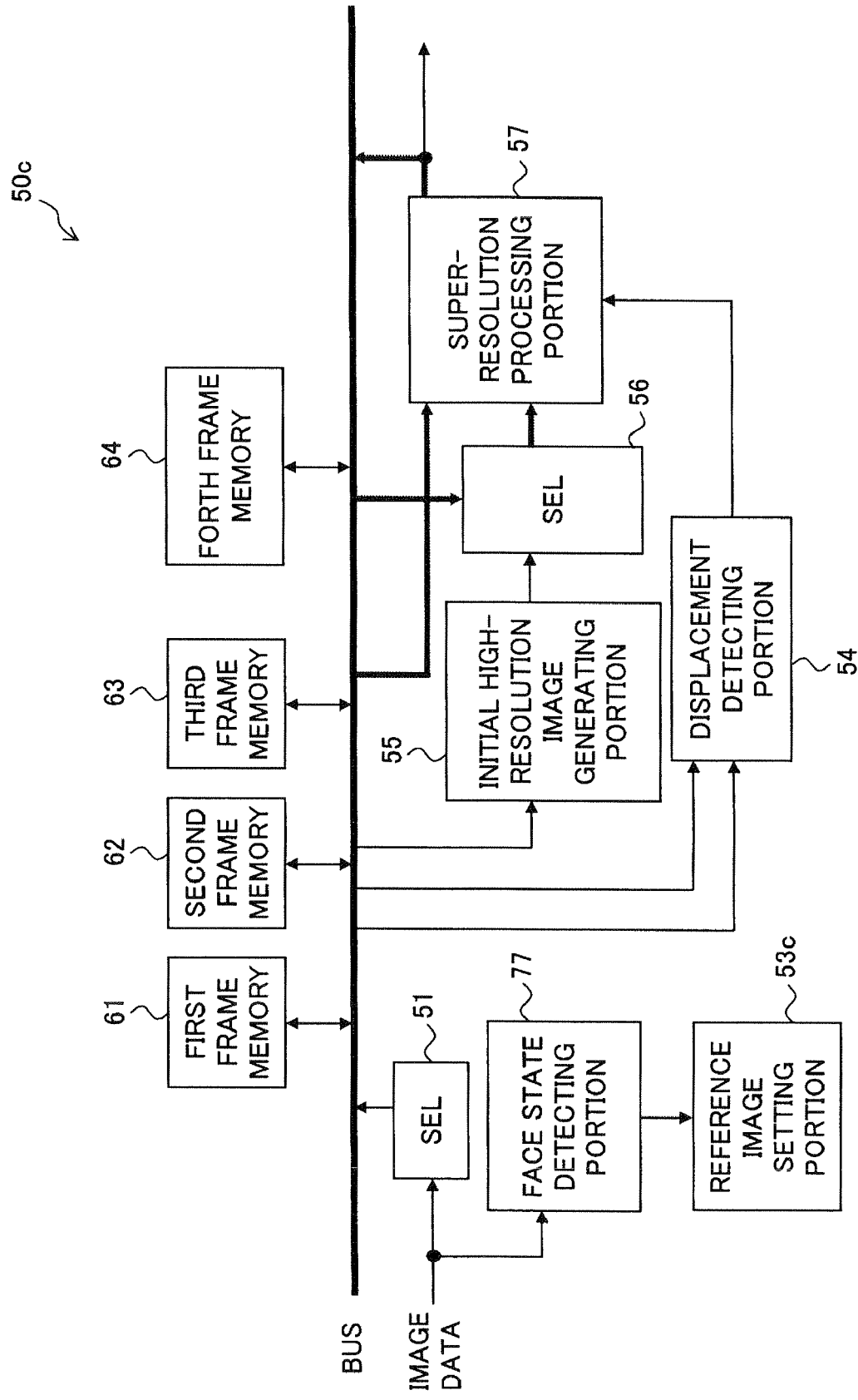
FIG. 24 is an internal block diagram of the super-resolution portion for performing the super-resolution processing according to Example 6 of the present invention.

FIG. 24 is an internal block diagram of a super-resolution portion 50c according to Example 6. Individual portions denoted by reference numerals 51, 54 to 57 and 61 to 64 disposed in the super-resolution portion 50c are the same as those in FIG. 4. Functions of a reference image setting portion 53c and a face state detecting portion 77 disposed in the super-resolution portion 50c are realized by the CPU 23 or the video signal processing portion 13 in FIG. 1. Except for the different method of setting the reference image, the super-resolution portion 50c is similar to the super-resolution portion 50 according to Example 1 (FIG. 4). Therefore, in the following, functions of the reference image setting portion 53c and the face state detecting portion 77 concerning the setting of the reference image will be described. In Example 6, similarly to Example 1, it is supposed that one high-resolution image is generated from the three observed low-resolution images $L_1$ to $L_3$.

The face state detecting portion 77 performs the face detection process described above in Example 5 on each of the observed low-resolution images so as to extract a human face region on the observed low-resolution image. After that, the face state detecting portion 77 extracts an eye region including eyes in the face region based on the image data of the observed low-resolution image, and it further performs a blink detecting process for detecting a blinking state of eye. Any method including a known method can be used for the blink detecting process. For instance, it is possible to perform template matching using the image indicating a typical pupil as a template so that the presence or absence of a pupil in the eye region is detected. Then, it is possible to detect whether the eye is open or close from a result of the detection about the presence or absence of a pupil.

The reference image setting portion 53c sets the observed low-resolution image that is decided to have an open eye by the blink detecting process among the observed low-resolution images $L_1$ to $L_3$ as the reference image. For instance, if it is decided that eyes on the images $L_2$ and $L_3$ are open and eyes on the image $L_1$ are close, the image $L_2$ or $L_3$ is set to be the reference image and other two (the images $L_1$ and $L_2$, or the images $L_1$ and $L_3$) are set to be the object images.

Further, if it is decided that eyes on the images $L_2$ and $L_3$ are open and eyes on the image $L_1$ are close, the eye region (or the entire face region) of the image $L_1$ should not be used for the super-resolution processing in order to prevent a double image from occurring on the high-resolution image. In this case, the part other than the eye region (or the entire face region) in the high-resolution image is generated from the images $L_1$ to $L_3$ while the eye region (or the entire face region) in the high-resolution image is generated from only the images $L_2$ and $L_3$.

After the face region on the observed low-resolution image is extracted, it is possible to make the face state detecting portion 77 perform not the blink detecting process but a smile face detection process. The smile face detection process is performed for each of the observed low-resolution images. In the smile face detection process, it is decided whether or not the face included in the face region is smiling based on the image data of the observed low-resolution image. Any method including a known method can be used for the smile face detection process.

If the smile face detection process is performed, the reference image setting portion 53c sets the observed low-resolution image that is decided to have a smiling face in the face region by the smile face detection process is set as the reference image among the observed low-resolution images $L_1$ to $L_3$. For instance, if it is decided that faces on the images $L_2$ and $L_3$ are smiling and that a face on the image $L_1$ is not smiling, the image $L_2$ or $L_3$ is set as the reference image while other two (the images $L_1$ and $L_2$, or the images $L_1$ and $L_3$) are set as the object image.

Further, if it is decided that faces on the images $L_2$ and $L_3$ are smiling and that a face on the image $L_1$ is not smiling, the entire face region of the image $L_1$ should not be used for the super-resolution processing in order to prevent a double image from occurring on the high-resolution image. In this case, the part other than the face region in the high-resolution image is generated from the images $L_1$ to $L_3$ while the face region in the high-resolution image is generated from only the images $L_2$ and $L_3$.

In addition, it is possible to set the reference image by using both the blink detecting process and the smile face detection process described above. In this case, the observed low-resolution image that is decided to have an open eye by the blink detecting process and is decided to have a smiling face in the face region by the smile face detection process is set as the reference image.

According to Example 6, it is possible to generate the high-resolution image that is preferable for the user because it has a good facial state.

EXAMPLE 7

Next, Example 7 will be described. In Example 7, the reference image is set based on the AF score that is used for automatic focus control.

Figure 25:
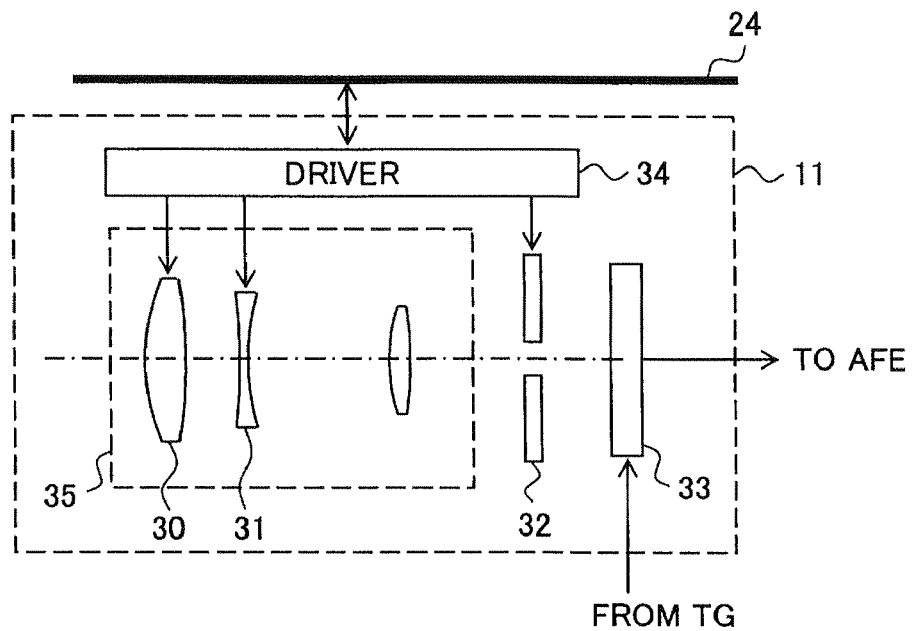
FIG. 25 is a diagram of an internal structural of the image sensing portion of FIG. 1.

First, with reference to FIG. 25, an internal structure of the image sensing portion 11 in FIG. 1 will be described in detail. FIG. 25 is a diagram of an internal structural of the image sensing portion 11. The image sensing portion 11 includes an optical system 35, a diaphragm 32, an image sensor 33 and a driver 34. The optical system 35 is made up of a plurality of lenses including a zoom lens 30 and a focus lens 31. The zoom lens 30 and the focus lens 31 can move in the optical axis direction.

The driver 34 controls the movements of the zoom lens 30 and the focus lens 31 based on a control signal from the CPU 23 so as to control the zoom magnification of the optical system 35 and a position of the focal point. The driver 34 controls an aperture of the diaphragm 32 (a size of the opening) based on a control signal from the CPU 23. The incident light from an object enters the image sensor 33 via the lenses of the optical system 35 and the diaphragm 32. The lenses of the optical system 35 form an optical image of the object on the image sensor 33. Drive pulses for driving the image sensor 33 are supplied from the TG 22.

Figure 26:
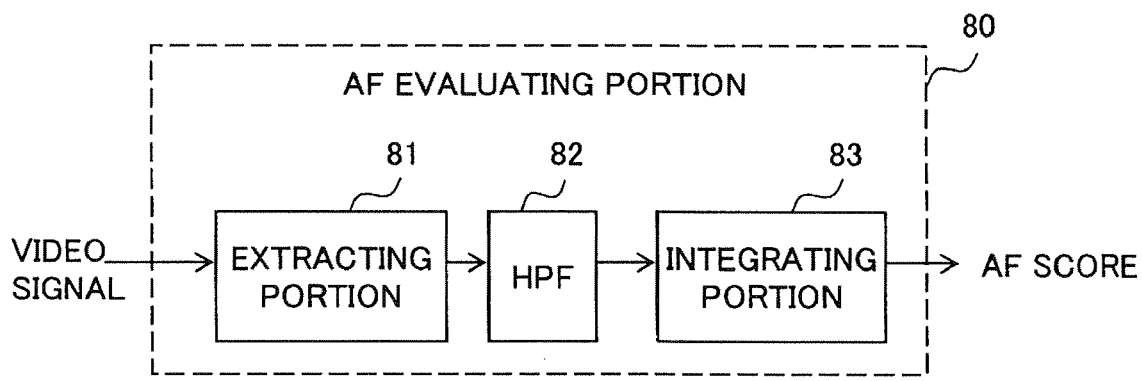
FIG. 26 is an internal block diagram of an AF evaluating portion disposed in a video signal processing portion of FIG. 1.

The image sensing apparatus 1 performs the automatic focus control by using the through-the-lens (TTL) method. For performing this automatic focus control, the video signal processing portion 13 in FIG. 1 includes an AF evaluating portion (a focus score estimating portion). FIG. 26 is an internal block diagram of an AF evaluating portion 80 disposed in the video signal processing portion 13.

The AF evaluating portion 80 is made up of an extracting portion 81, a high pass filter (HPF) 82 and an integrating portion 83. The AF evaluating portion 80 calculates one AF score (focus score) for one frame image.

Figure 27A:
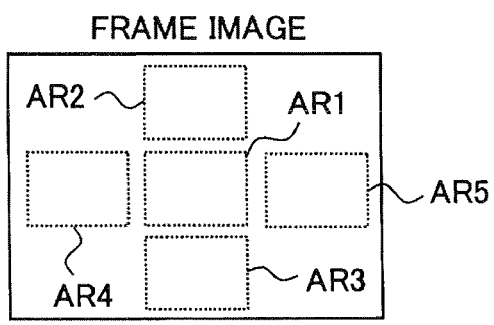
FIG. 27A is a diagram illustrating an AF evaluation region defined in a frame image by the AF evaluating portion of FIG. 26.

The extracting portion 81 is provided with a video signal of the frame image. The extracting portion 81 extracts a luminance signal in the AF evaluation region (focus evaluation region) defined in the frame image from the video signal. The AF evaluation region is made up of a plurality of element regions that are separated from each other. FIG. 27A illustrates an example of setting the AF evaluation region. For instance, the frame image is divided equally into three in the vertical direction and is divided equally into three in the horizontal direction so that nine split regions are defined in the frame image. Then, as illustrated in FIG. 27A, among the nine split regions, the entire or a part of the split region that is located at the middle of the frame image is set as the element region AR1 while the entire or a part of the split regions located on the four side of the element region AR1 in the vertical and the horizontal directions are set as the element regions AR2 to AR5. In this case, a total area of the element regions AR1 to AR5 corresponds to the AF evaluation region. Note that it is possible to form the AF evaluation region with one element region. For instance, the element region AR1 itself may be set as the AF evaluation region. In the following description, it is supposed that the AF evaluation region is made up of the element regions AR1 to AR5.

Figure 7:
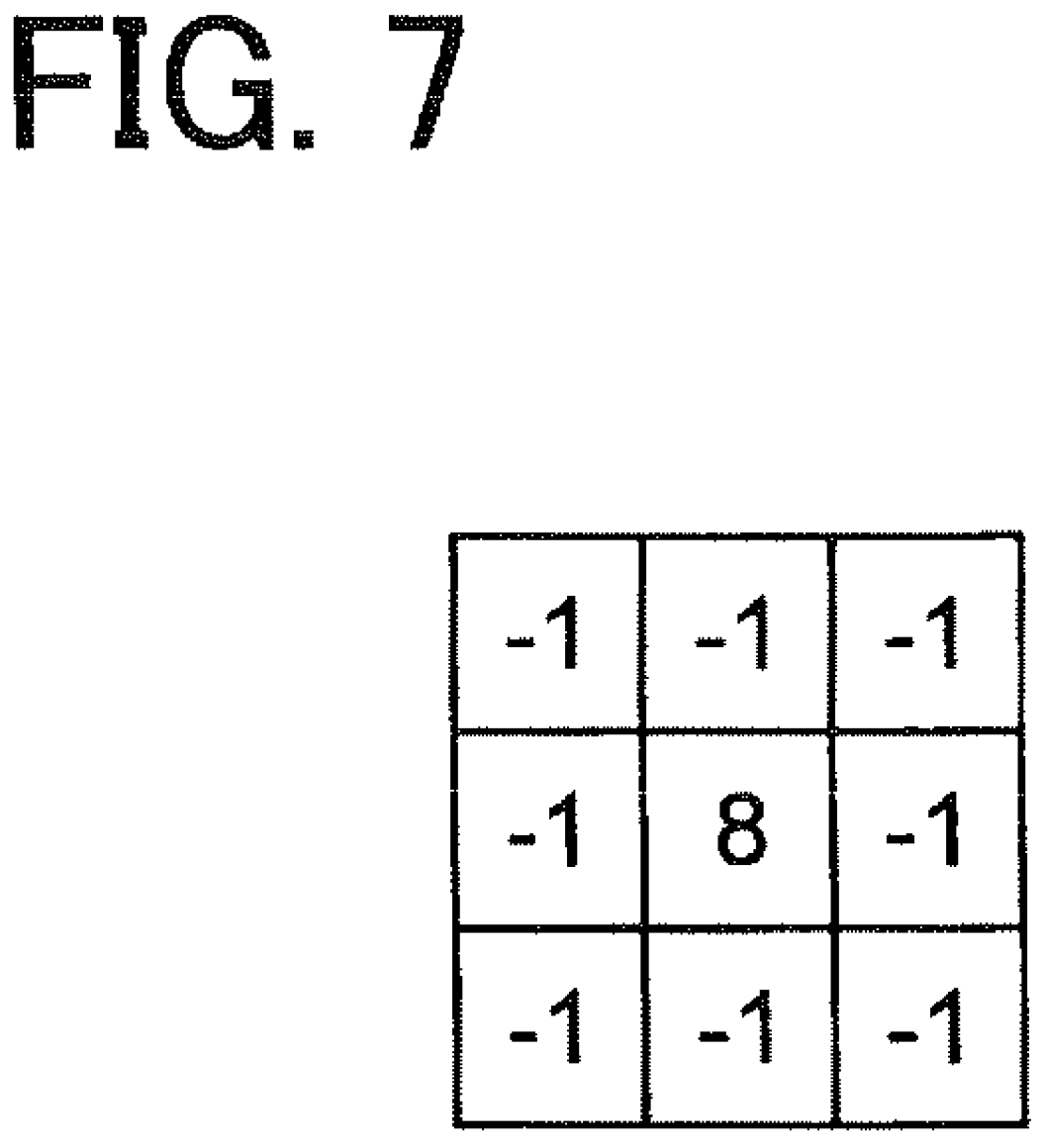

The HPF 82 extracts only predetermined high frequency components in the luminance signal extracted by the extracting portion 81. For instance, the HPF 82 is made up of a Laplacian filter having a filter size of 3×3 as illustrated in FIG. 7, and the Laplacian filter is made to operate on the pixels in the AF evaluation region so that the space filtering is performed. Then, output values corresponding to filter characteristics of the Laplacian filter are obtained sequentially from the HPF 82.

Figure 27B:
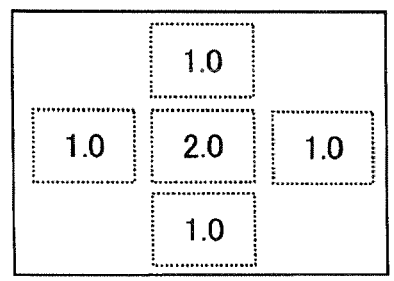
FIG. 27B is a diagram illustrating a weight coefficient that is set for calculating an AF score.

The integrating portion 83 integrates amplitudes of the high frequency components extracted by the HPF 82 (i.e., absolute values of the output values of the HPF 82). This integration is performed individually for each of the element regions. Therefore, an integrated value is calculated for each of the element regions AR1 to AR5. The integrating portion 83 calculates the AF score by performing a weighted summing operation of the integrated values in accordance with predetermined weight coefficients. It is supposed that a weight coefficient for the element region AR1 is higher than weight coefficients for other element regions. For instance, as illustrated in FIG. 27B, it is supposed that the weight coefficient for the element region AR1 is 2.0 while the weight coefficients for other element regions AR2 to AR5 are 1.0. Then, the value calculated as the AF score is the total sum of the integrated value calculated for the element region AR1 multiplied by two and the integrated values calculated for element regions AR2 to AR5.

The AF scores calculated for the frame images obtained sequentially are sent to the CPU 23 in FIG. 1 one by one. The AF score of a certain frame image is substantially proportional to an amount of high frequency components in the AF evaluation region of the frame image so that the AF score increases along with an increase of the amount. The amount of the high frequency components is also referred to as an intensity of high frequency components.

When the automatic focus control is performed, the focus lens 31 is moved step by step while the AF scores are obtained sequentially. The position of the focus lens 31 when the AF score becomes maximum (or locally maximum) is determined as the focused lens position. Then, for instance, the three frame images shot successively in the state where the focus lens 31 is positioned at the focused lens position are handled as the above-mentioned observed low-resolution images $L_1$ to $L_3$.

The observed low-resolution images $L_1$ to $L_3$ are also supplied to the AF evaluating portion 80, and the AF score for each of the observed low-resolution images $L_1$ to $L_3$ is also determined as described above. Then, in Example 7, the observed low-resolution image corresponding to the maximum AF score is set as the reference image among the AF scores of the observed low-resolution images $L_1$ to $L_3$.

Figure 28:
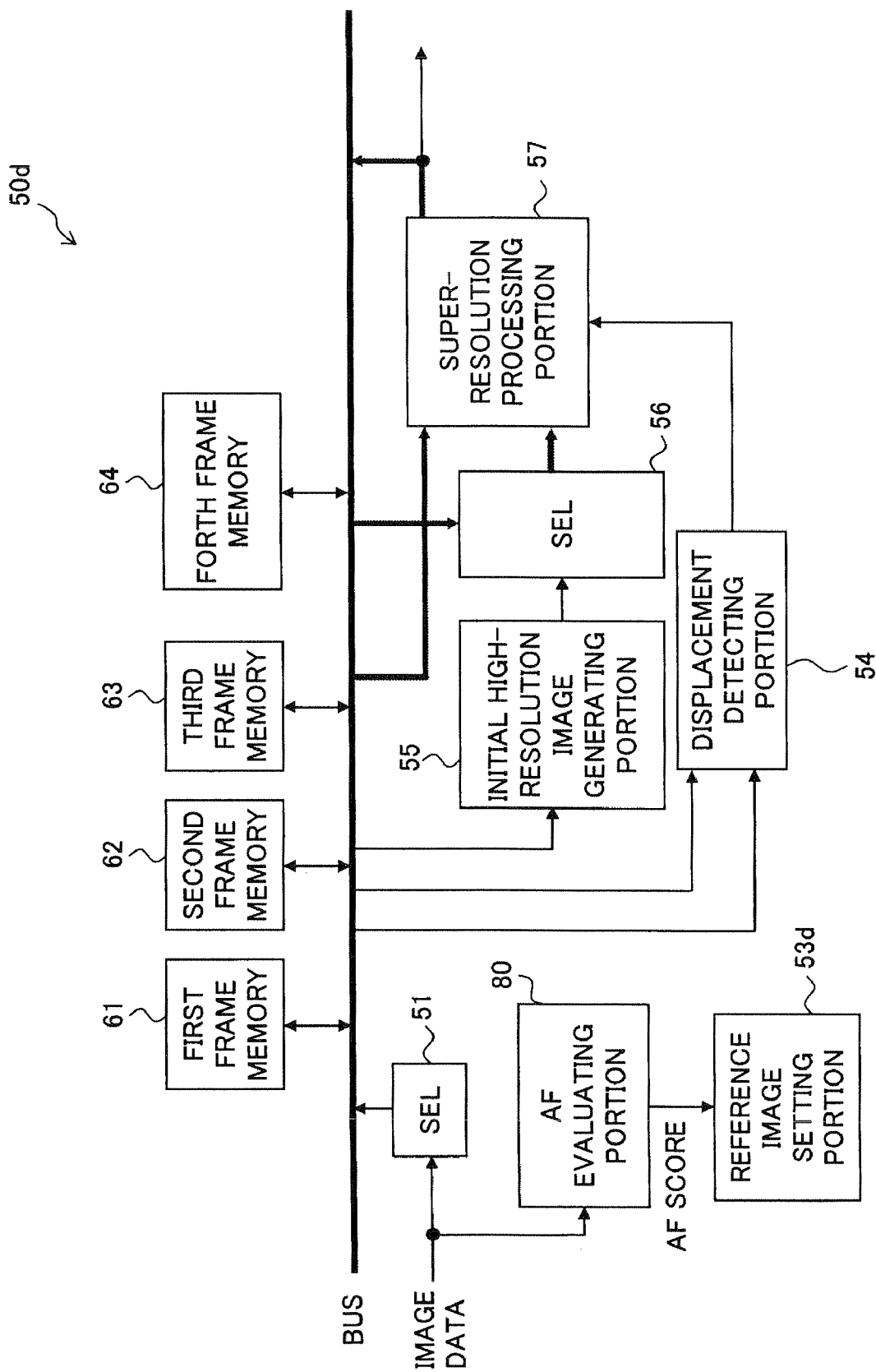
FIG. 28 is an internal block diagram of the super-resolution portion for performing the super-resolution processing according to Example 7 of the present invention.

FIG. 28 is an internal block diagram of a super-resolution portion 50*d* for performing the super-resolution processing according to Example 7. The super-resolution portion 50*d* is made up of individual portions denoted by reference numerals 51, 80, 53*d* and 54 to 57 and the frame memories 61 to 64. In other words, the super-resolution portion 50*d* is constituted by replacing the blur estimating portion 52 and the reference image setting portion 53 in the super-resolution portion 50 of FIG. 4 with the AF evaluating portion 80 and the reference image setting portion 53*d*. Operations of portions other than the AF evaluating portion 80 and the reference image setting portion 53*d* in the super-resolution portion 50*d* are the same as those in the super-resolution portion 50 of the FIG. 4. Therefore, overlapping descriptions of the common portions will be omitted. The reference image setting portion 53*d* is realized by the CPU 23. However, the function of the reference image setting portion 53*d* may be performed by the video signal processing portion 13.

The AF evaluating portion 80 sends the AF scores for the observed low-resolution images $L_1$ to $L_3$ to the reference image setting portion 53*d*. The reference image setting portion 53*d* performs the process of setting the reference image and the object images based on the AF scores of the images $L_1$ to $L_3$. Specifically, it determines the maximum AF score among the three AF scores obtained for the images $L_1$ to $L_3$, and it sets the observed low-resolution image corresponding to the maximum AF score as the reference image while it sets the other two observed low-resolution images as the object images. Operations after the reference image and the object images are set are the same as those in Example 1.

Figure 29:
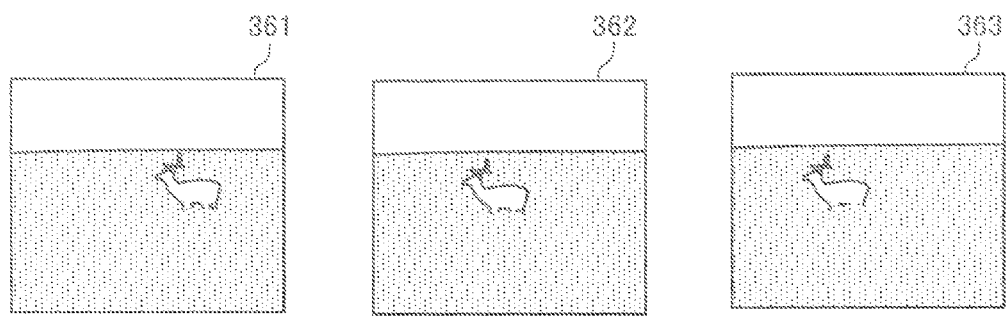
FIG. 29 is a diagram illustrating an example of three observed low-resolution images according to Example 7 of the present invention.

Now, it is supposed that a moving object is included in a field of view of the image sensing apparatus 1. The moving object means an object that is moving in the real space. Then, it is supposed that the frame images 361, 362 and 363 of FIG. 29 are obtained and that the frame images 361, 362 and 363 are the observed low-resolution images $L_1$, $L_2$ and $L_3$, respectively. The frame images 361 to 363 include an animal as the moving object. As the animal moves relatively to the image sensing apparatus 1, so that the animal is shot on the right side in the frame image 361, on the substantially middle portion in the frame image 362, and on the left side in the frame image 363. In addition, it is supposed that the lens position of the focus lens 31 is fixed so as to focus on the animal when the frame images 361 to 363 are shot.

In this case, as understood from the calculation method of the AF score, there is a high possibility that the AF score of the image $L_2$ becomes maximum among the AF scores of the images $L_1$, $L_2$ and $L_3$. If the AF score of the image $L_2$ is actually largest, the image $L_2$ is set as the reference image for performing the super-resolution processing. Therefore, similarly to the image $L_2$, the noted animal in the high-resolution image is located substantially in the middle position.

According to the present example, it is possible to obtain the high-resolution image in which the moving object noted by the photographer (i.e., the focused moving object) is located in the middle thereof. In other words, the high-resolution image having a desired composition matching a photographer's intention can be obtained automatically.

Note that the initial high-resolution image is generated from the reference image by using the linear interpolation or the like in the super-resolution processing of the present embodiment. Then, in accordance with a displacement between the reference image and each of the object images with respect to the reference image, the estimated low-resolution image is generated from the high-resolution image (first, the initial high-resolution image). Thus, the high-resolution image is updated so that an error between the estimated low-resolution image and the observed low-resolution image is minimized. Therefore, it can be said that the finally obtained high-resolution image is the image in which a resolution of the reference image is improved (the object image is the image that is referred to for improving the resolution). Accordingly, when the frame image 362 of FIG. 29 is set as the reference image, the noted animal is located substantially at the middle in the obtained high-resolution image.

EXAMPLE 8

Next, Example 8 will be described. In Example 8, constituent techniques for obtaining the high-resolution image from a plurality of observed low-resolution image will be described. Items described in Example 8 can be applied to Examples 1 to 7 described above.

In Example 8, for simplification of description, the case where one high-resolution image having a 6×6 image size is generated from two observed low-resolution images having a 3×3 image size will be exemplified. One of the two observed low-resolution images is referred to as a first observed low-resolution image while the other is referred to as a second observed low-resolution image. It is supposed that the first observed low-resolution image is set as the reference image while the second observed low-resolution image is set as the object image. Note that in the following description the first and the second observed low-resolution images may be respectively referred to as first and second observed images shortly.

FIGS. 30A and 30B illustrate pixel arrangements of the first and the second observed images, and FIG. 30C illustrates a pixel arrangement of the high-resolution image. The pixel arrangement of FIG. 30C is a pixel arrangement of a high-resolution image $H_n$ including the initial high-resolution image $H_0$ (n is an integer more than or equal to zero). In addition, the estimated low-resolution image and the differential image are generated from the high-resolution image in the stage of the super-resolution computing process (see FIG. 8), where the pixel arrangements of the estimated low-resolution image and the differential image corresponding to the k-th observed image are the same as those of the k-th observed image (k=1 or 2 in Example 8). The estimated low-resolution image and the differential image corresponding to the k-th observed image are referred to as the k-th estimated low-resolution image and the k-th differential image, respectively.

In FIGS. 30A-30C and in FIGS. 32, 33A, 33B and 35 that will be referred to later, the black quadrangles indicate points where the pixels of the first observed image, the first estimated low-resolution image or the first differential image are located. The black triangles indicate points where the pixels of the second observed image, the second estimated low-resolution image or the second differential image are located. The black circles indicate points where the pixels of the high-resolution moving image are located.

In each image, pixels are located like a matrix. The coordinates indicating the positions of total nine pixels in one observed image (or the estimated low-resolution image or the differential image) are expressed by (i, j) using i and j that satisfy "$0 \leq i \leq 2$" and "$0 \leq j \leq 2$". Here, i and j are integers. The coordinates indicating positions of total 36 pixels in the high-resolution image are expressed by (i, j) using i and j that satisfy "$0 \leq i \leq 5$" and "$0 \leq j \leq 5$". Here, i indicates a coordinate value in the row direction (i.e., vertical direction), and j indicates a coordinate value in the column direction (i.e., horizontal direction).

Further, the first and the second observed images expressed in a matrix are denoted by $y_1$ and $y_2$, respectively. In addition, as described in Example 1, the high-resolution image $H_n$ expressed in a matrix is denoted by $x''$. Then, a pixel value of a pixel at the coordinates (i, j) in the first observed image is denoted by $y_1(i, j)$, a pixel value of a pixel at the coordinates (i, j) in the second observed image is denoted by $y_2(i, j)$, and a pixel value of a pixel at the coordinates (i, j) in the high-resolution image $H_n$ is denoted by $x''(i, j)$. Then, $y_1$, $y_2$ and $x''$ are expressed by the equations (B-1), (B-2) and (B-3). Note that the matrix with the superscript T indicates the transposed matrix of the original matrix as described above.

$$y_1 [y_1(0,0), y_1(0,1), \ldots, y_1(2,2)]^T \quad (B-1)$$

$$y_2 [y_2(0,0), y_2(0,1), \ldots, y_2(2,2)]^T \quad (B-2)$$

$$x'' [x''(0,0), x''(0,1), \ldots, x''(5,5)]^T \quad (B-3)$$

[Calculation Method of Displacement in Sub-Pixel Accuracy]

First, a calculation method of the displacement between the first and the second observed images with respect to the first observed image as the reference image will be described. As described above in Example 1, the displacement is calculated by using the representative point matching method, the block matching method, the gradient method or the like so as to have a sub pixel resolution. As an example, the case where the representative point matching method is used will be described.

If the representative point set in the first observed image is the pixel at the coordinates (0, 0), and if the detection block size in the representative point matching method is 1×1, the correlation value E(i, j) corresponding to the position (i, j) is expressed by the equation (B-4). The correlation value E(i, j) is determined for each of the values of (i, j)=(0, 0), (0, 1), . . . (2, 2), and the minimum correlation value is specified among the obtained total nine correlation values E(0, 0) to E(2, 2). When the minimum correlation value is denoted by $E(i_O, j_O)$, $i_O$ and $j_O$ define the displacement between the first and the second observed images with an integer accuracy.

$$E(i,j) = |y_1(0,0) - y_2(i,j)| \quad (B-4)$$

Figure 31A:
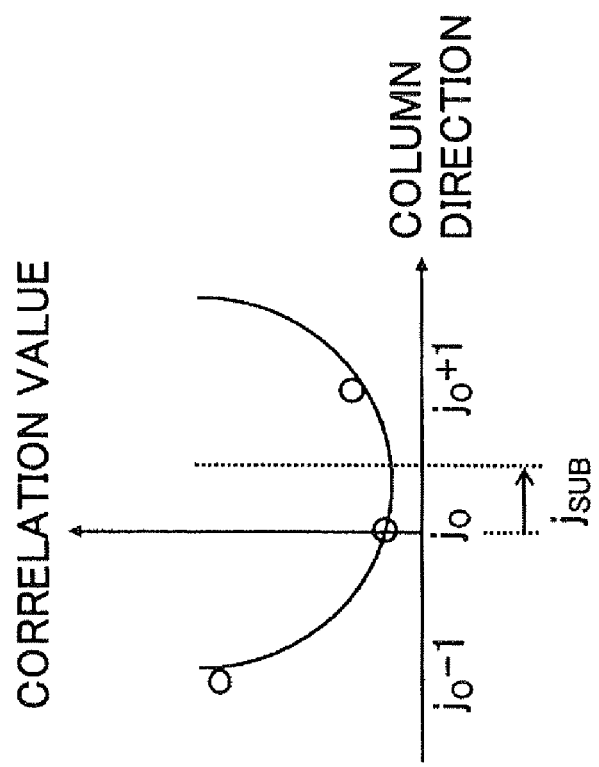
FIGS. 31A and 31B are diagrams illustrating a manner in which the displacement is calculated with a sub-pixel accuracy by parabola approximation according to Example 8 of the present invention.
Figure 31B:
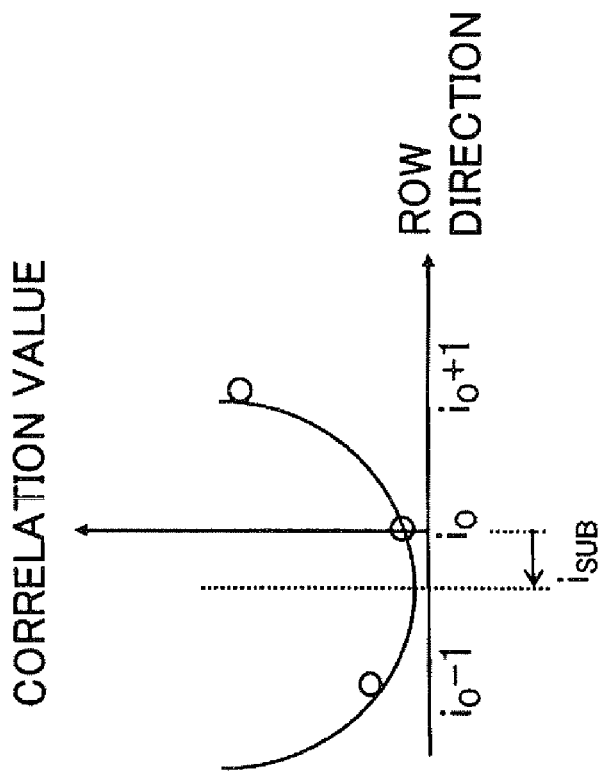
Figure 32:
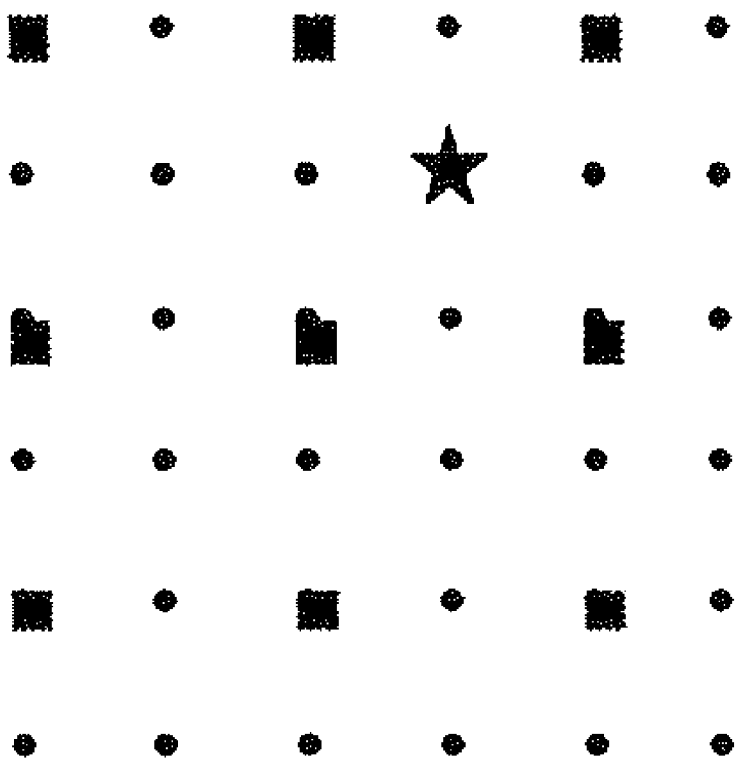
FIG. 32 is a diagram illustrating a manner in which the initial high-resolution image is generated from a first observed low-resolution image according to Example 8 of the present invention.
Figure 33A:
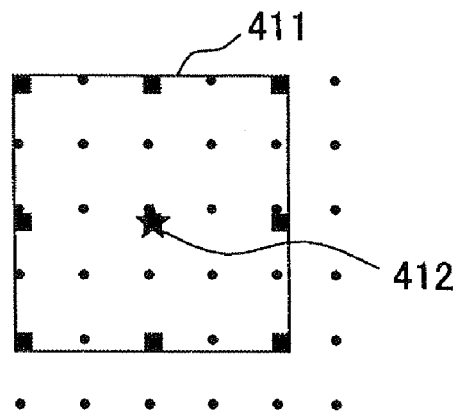
FIGS. 33A and 33B are diagrams illustrating a manner in which a operation of a spatial domain filter is used on the high-resolution image for reconstructing the low-resolution image from the high-resolution image according to Example 8 of the present invention.
Figure 33B:
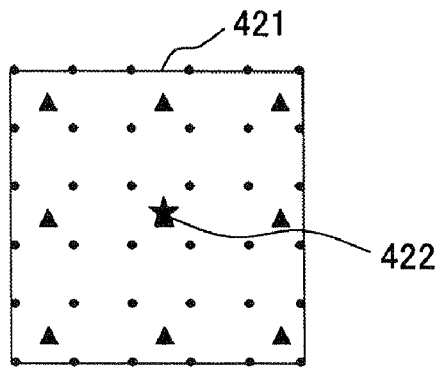

A decimal point portion of the displacement is calculated based on the correlation values of the pixels neighboring the pixel of the minimum correlation value $E(i_O, j_O)$ vertically and horizontally as well as the correlation value $E(i_O, j_O)$ utilizing, for example, a parabola approximation as illustrated in FIGS. 31A and 31B. For instance, if "$i_O=1$" and "$j_O=1$" hold, a row direction component $i_{SUB}$ and a column direction component $j_{SUB}$ of the decimal point portion of the displacement are determined in accordance with the equations (B-5) and (B-6) below. However, any other known method such as a linear approximation may be used for calculating the displacement of the decimal point portion.

$$i_{SUB} = \frac{E(0, 1) - E(2, 1)}{2E(0, 1) - 4E(1, 1) + 2E(2, 1)} \quad (B-5)$$

$$j_{SUB} = \frac{E(1, 0) - E(1, 2)}{2E(1, 0) - 4E(1, 1) + 2E(1, 2)} \quad (B-6)$$

Finally, the displacement between the first and the second observed images is expressed with $i_O$ and $j_O$ as well as $i_{SUB}$ and $j_{SUB}$. In other words, the row direction component and the column direction component (i.e., the vertical component and the horizontal component) of the displacement are expressed with ($i_O + i_{SUB}$) and ($j_O + j_{SUB}$), respectively.

[Generation Method of the Initial High-Resolution Image]

The initial high-resolution image $H_0$ is generated from the first observed image as the reference image by using the linear interpolation or the bicubic interpolation. For instance, "$y_1(0, 0) = x^0(0, 0)$" is set, and the linear interpolation is used for magnifying the first observed image by two times so that the initial high-resolution image $H_0$ is generated. In this case, the pixel value $x^0(1, 3)$ indicated by star marks in FIG. 32 at the coordinates (1, 3) in the image $H_0$ is calculated in accordance with the equation (B-7) below.

$$x^0(1, 3) = \frac{y_1(0, 1) + y_1(0, 2) + y_1(1, 1) + y_1(1, 2)}{4} \quad (B-7)$$

[Generation Method of the Estimated Low-Resolution Image and the Differential Image]

In the super-resolution computing process performed by the super-resolution processing portion 57 in FIG. 4 and the like, the matrix $W_k$ is made to operate on the high-resolution image so that the low-resolution image (the above-mentioned estimated low-resolution image) is reconstructed (see FIG. 8). The matrix $W_k$ is an image conversion matrix including the displacement calculated by the displacement detecting portion 54, a point spread function indicating an image blur generated by a resolution decreasing process from the high-resolution image to the low-resolution image, and down sampling from the high-resolution image to the low-resolution image, as described above. As the point spread function included in this matrix $W_k$, a Gaussian function $PSF_k(i, j)$ expressed in the equation (B-8) below is used, for example.

$$PSF_k(i, j) = \frac{1}{\sqrt{2\pi}\,\sigma} \cdot \exp\left(-\frac{(i - s_x - v_k^x)^2 + (j - s_y - v_k^y)^2}{2\sigma^2}\right) \quad (B-8)$$

Here, $v_k^x$ and $v_k^y$ denote decimal point portions of the displacement of the k-th observed image with respect to the high-resolution image, and $v_k^x$ and $v_k^y$ respectively denote decimal point portions of the row direction component and the column direction component of the displacement. However, $v_k^x$ and $v_k^y$ are expressed as values on the high-resolution image. In other words, for instance, a displacement (position displacement) of the row direction component for 0.5 pixel on the high-resolution image is expressed as $v_k^x = 0.5$.

Further, $s_x$ and $s_y$ denote a size of the spatial domain filter (size of a filter base) that is made to operate on the high-resolution image when the estimated low-resolution image is generated from the high-resolution image. Here, $s_x$ and $s_y$ has integer values. In the present example, "$s_x=s_y=2$" holds. If a value of $v_k{}^x$ or $v_k{}^y$ has no decimal part, tap numbers in the row direction and in the column direction of the spatial domain filter are $(2s_x+1)$ and $(2s_y+1)$, respectively. If the value of $v_k{}^x$ or $v_k{}^y$ has a decimal part, the tap numbers in the row direction and in the column direction of the spatial domain filter are $3s_x$ and $3s_y$, respectively. In addition, $\sigma^2$ denotes a variance in the Gaussian function.

As an example, it is supposed that pixels of the first and the second estimated low-resolution images at the coordinates (1, 1) are generated from the high-resolution image in the case where the integer parts of the displacements of the first and the second observed images with respect to the high-resolution image are zero and "$v_1{}^x=0$", "$v_1{}^y=0$", "$v_2{}^x=0.5$" and "$v_2{}^y=0.5$" hold.

In this case, concerning the first estimated low-resolution image, "$v_1{}^x=0$" and "$v_1{}^y=0$" hold. Therefore, the tap numbers in the row direction and in the column direction of the spatial domain filter to operate on the high-resolution image are both 5 (=2×2+1). The square 411 in FIG. 33A indicates the filter base of the spatial domain filter (a range where an impulse response of the filter is not zero) to operate on the high-resolution image for generating the pixel 412 at the coordinates (1, 1) in the first estimated low-resolution image. In order to generate the pixel 412 by the reconstruction, pixel values of 25 pixels (i.e., pixels at coordinates (0, 0) to (4, 4)) in the high-resolution image located in the filter base 411 are referred to. On the lower side of FIG. 33A, the point spread function of the matrix $W_1$ to operate on the 25 pixels (point spread function with respect to the low-resolution image) is illustrated.

In addition, concerning the second estimated low-resolution image, "$v_2{}^x=0.5$" and "$v_2{}^y=0.5$" hold. Therefore, the tap numbers in the row direction and in the column direction of the spatial domain filter to operate on the high-resolution image are both 6 (=3×2). The square 421 in FIG. 33B indicates the filter base of the spatial domain filter to operate on the high-resolution image for generating the pixel 422 at the coordinates (1, 1) in the second estimated low-resolution image. In order to generate the pixel 422 by the reconstruction, pixel values of 36 pixels (i.e., pixels at coordinates (0, 0) to (5, 5)) in the high-resolution image located in the filter base 421 are referred to. On the lower side of FIG. 33B, the point spread function of the matrix $W_2$ to operate on the 36 pixels (point spread function with respect to the low-resolution image) is illustrated.

Figure 34:
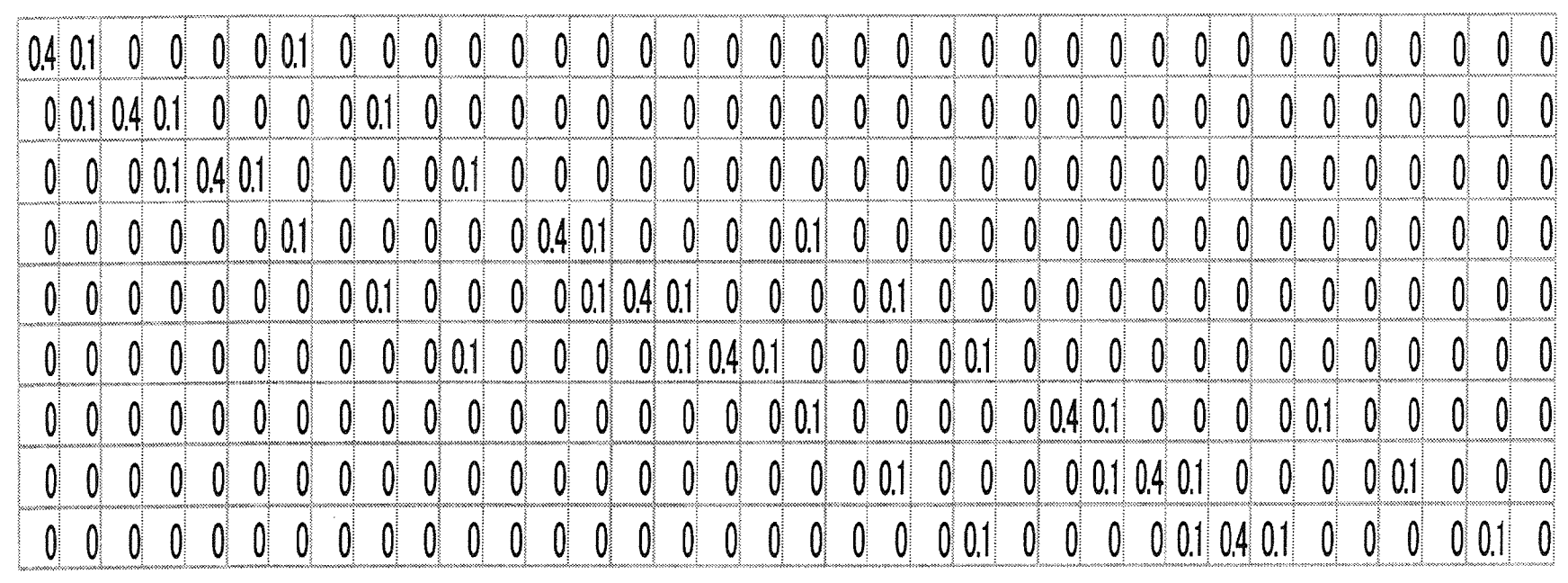

Further, $W_k x^n$ denotes the k-th estimated low-resolution image in a matrix, which is reconstructed from the high-resolution image $H_n$ and is expressed by the equation (B-9) below. FIG. 34 illustrates an example of the matrix $W_1$. In case of the present example, the matrix $W_1$ becomes a 9×36 matrix. Then, pixel values of the k-th estimated low-resolution image are subtracted from the pixel values of the k-th observed image so that the k-th differential image is generated (see FIG. 8). The matrix $(y_k - W_k x^n)$ indicating the k-th differential image is expressed by the equation (B-10) below.

$$W_k x^n = [(W_k x^n)(0,0), (W_k x^n)(0,1), \ldots, (W_k x^n)(2,2)]^T \quad \text{(B-9)}$$

$$y_k - W_k x^n = [d_k(0,0), d_k(0,1), \ldots, d_k(2,2)]^T \quad \text{(B-10)}$$

[Update of the High-Resolution Image Based on the Differential Image]

After the differential image with respect to each of the low-resolution images is obtained, each of the differential images is fed back on the coordinate surface of the high-resolution image so that the high-resolution image is updated.

Figure 35:
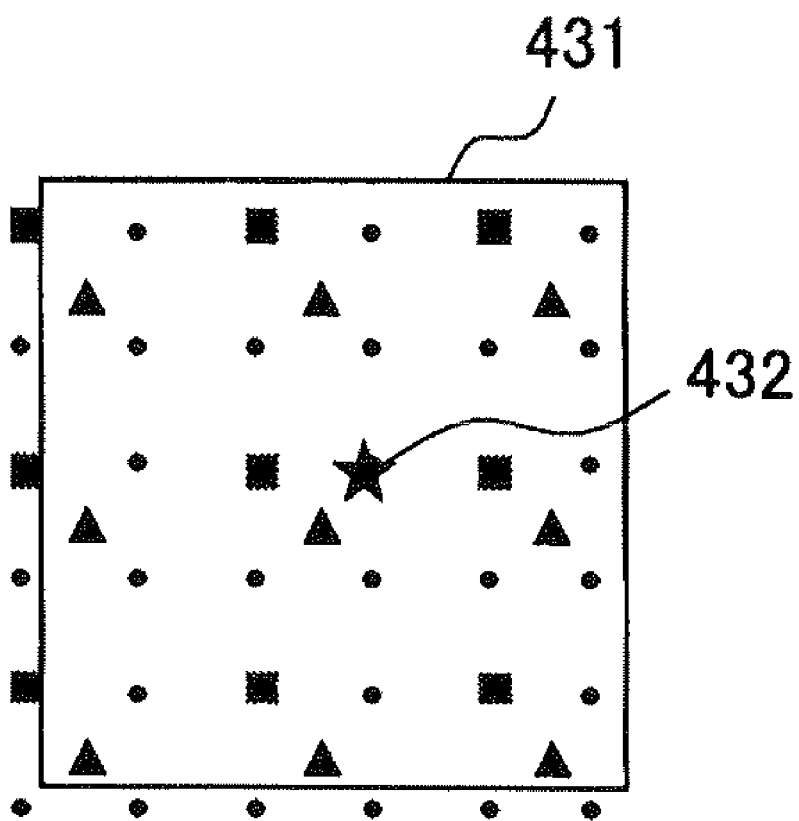
FIG. 35 is a diagram illustrating a relationship between a pixel arrangement of the high-resolution image to be updated and a pixel arrangement of the low-resolution image to be used for the update according to Example 8 of the present invention.

For instance, as illustrated in FIG. 35, the pixels in the first differential image that are fed back to the pixel 432 at the coordinates (2, 3) on the high-resolution image are six pixels (of black quadrangle) in the quadrangle frame 431. The pixels in the second differential image that are fed back to the pixel 432 are nine pixels (of black triangle) in the quadrangle frame 431. However, as described above, it is supposed that the integer parts of the displacements of the first and the second observed images with respect to the high-resolution image are zero and "$v_1{}^x=0$", "$v_1{}^y=0$", "$v_2{}^x=0.5$" and "$v_2{}^y=0.5$" hold.

A feedback value error(2, 3) corresponding to the pixel 432 is expressed by the equation (B-11) below. Here, values of $PSF_1(0, 1)$ and the like comply with the above equation (B-8). FIGS. 36A and 36B illustrate the point spread functions (with respect to the high-resolution image) in the transpose matrices $W_1{}^T$ and $W_2{}^T$ that are used for calculating the error(2, 3).

$$\begin{aligned}\text{error}(2,3) = &PSF_1(1,0)d_1(0,1) + PSF_1(3,0)d_1(0,2) + PSF_1\\&(1,2)d_1(1,1) + PSF_1(3,2)d_1(1,2) + PSF_1(1,4)d_1(2,\\&1) + PSF_1(3,4)d_1(2,2) + PSF_2(0,1)d_2(0,0) + PSF_2(2,\\&1)d_2(0,1) + PSF_2(4,1)d_2(0,2) + PSF_2(0,3)d_2(1,0) +\\&PSF_2(2,3)d_2(1,1) + PSF_2(4,3)d_2(1,2) + PSF_2(0,5)d_2\\&(2,0) + PSF_2(2,5)d_2(2,1) + PSF_2(4,5)d_2(2,2)\end{aligned} \quad \text{(B-11)}$$

The feedback value is determined for each of the pixels constituting the high-resolution image. A matrix "Error" indicating all the determined feedback values can be determined by the product-sum operation of the matrix $(y_k - W_k x^n)$ indicating the k-th differential image and the transposed matrix of $W_k$ as shown in the equation (B-12) below. Note that FIG. 37 illustrates the transposed matrix of the matrix $W_1$ of FIG. 34. After the matrix "Error" is determined, the matrix $x^n$ is updated in accordance with the equation (B-13) so that the matrix $x^{n+1}$ is generated. In other words, the high-resolution image $H_n$ is updated so that the high-resolution image $H_{n+1}$ is generated. The equation (B-13) is equivalent to the equation (A-1) described above in Example 1.

$$\text{Error} = \sum_{k=1}^{2} W_k^T (y_k - W_k x^n) \quad \text{(B-12)}$$

$$x^{n+1} = x^n + \beta[\text{Error} - \alpha C^T C x^n] \quad \text{(B-13)}$$

Variations

The concrete values shown in the above description are merely examples, which can be modified to be various values as a matter of course. As variations or annotations of the above embodiment, Notes 1 to 6 are described as follows. The contents described in each Note can be combined freely as long as no contradiction arises.

[Note 1]

Although examples of generating one high-resolution image from two, three or four low-resolution images are described above, the number of low-resolution images for generating the high-resolution image may be any number of two or more.

[Note 2]

The embodiment described above exemplifies the super-resolution processing using the MAP method as one type of the reconstruction-based method for the super-resolution processing. However, the super-resolution processing that can be used in the present invention may be any type of super-resolution processing. In the embodiment described above, after the initial high-resolution image is generated, the super-resolution computing process including calculation of the update value and update of the high-resolution image by the update value is performed repeatedly. However, this iterative operation of the super-resolution computing process is not essential. It is possible to perform the super-resolution computing process only once and to handle the obtained high-resolution image $H_1$ as the high-resolution image to be determined finally.

[Note 3]

In the above-mentioned examples, various indicators to be used for selecting the reference image are described individually. For instance, as the indicator, the blur of the low-resolution image is used in Examples 1 to 3, the sensor detection data is used in Example 4, the size of the main object on the image is used in Example 5, and the facial state (the blinking state of eye or the facial expression) in the face region is used in Example 6.

Among these various indicators, any two or more indicators may be used in combination for selecting the reference image. For instance, it is possible to select the reference image based on the blur and the facial state in the face region. More specifically, for instance, if a plurality of observed low-resolution images are decided to have open eyes by the blink detecting process, the observed low-resolution image having the smallest blur may be set as the reference image among the plurality of observed low-resolution images that are decided to have open eyes. The method of selecting the reference image based on the blur and the facial state in the face region is naturally the method of selecting the reference image based on the blur and is also the method of selecting the reference image based on the facial state in the face region.

[Note 4]

The image sensing apparatus 1 of FIG. 1 can be realized by hardware or a combination of hardware and software. In particular, a part or the entire of the computing process performed in the super-resolution portion 50, 50a, 50b, 50c or 50d of FIG. 4, 17, 21, 24 or 28 may be realized by using software. Of course, it is possible to constitute the super-resolution portion 50, 50a, 50b, 50c or 50d only by hardware. If the image sensing apparatus 1 is constituted by using software, the block diagram of portions realized by software illustrates a function block diagram of the portions.

[Note 5]

It is also possible to realize the function of the super-resolution portion 50, 50a, 50b, 50c or 50d with an external device other than the image sensing apparatus 1 (e.g., a personal computer that is not illustrated). In this case, the super-resolution portion similar to the super-resolution portion 50, 50a, 50b, 50c or 50d is disposed in the external device. After the image sensing apparatus 1 obtains a plurality of low-resolution images, image information of the plurality of low-resolution images should be supplied to the external device via wired or wireless communication or via a recording medium.

[Note 6]

For instance, it is possible to consider as follows. The super-resolution portion 50, 50a, 50b, 50c or 50d can be referred to as an image processing device. The super-resolution processing portion 57 works as the high-resolution image generating portion. It can be considered that the high-resolution image generating portion includes the generating portion 55.

What is claimed is:

1. An image processing device which generates a high-resolution image from a plurality of low-resolution images, the high-resolution image having a resolution higher than a resolution of the low-resolution images, wherein
the image processing device comprises
a processor;
a memory; and
a reference image setting portion which selects a reference image from the plurality of low-resolution images based on image information of the plurality of low-resolution images, and
the image processing device generates the high-resolution image by performing a resolution increasing process on the plurality of low-resolution images for increasing a resolution with respect to the reference image.

2. The image processing device according to claim 1, further comprising a blur estimating portion which estimates an amount of blur included in each of the low-resolution images based on the image information, wherein the reference image setting portion selects the reference image based on an estimation result of the blur estimating portion.

3. The image processing device according to claim 2, wherein the blur estimating portion estimates the amount of blur included in each of the low-resolution images based on amounts of high frequency components in each of the low-resolution images.

4. The image processing device according to claim 2, wherein
the plurality of low-resolution images constitute a low-resolution image sequence obtained by a sequential shooting operation of an image sensing apparatus and arranged in a time sequence manner, and
the blur estimating portion detects a state of shake of the image sensing apparatus during a shooting period of the low-resolution image sequence based on a displacement between low-resolution images neighboring temporally in the low-resolution image sequence, so as to estimate a large and small relationship of the amount of blur between the plurality of low-resolution images based on a detection result of the state of shake.

5. The image processing device according to claim 2, wherein the reference image setting portion selects the low-resolution image having the smallest estimated amount of blur as the reference image among the plurality of low-resolution images.

6. The image processing device according to claim 1, wherein
the low-resolution images are obtained by a shooting operation of an image sensing apparatus,
the image information includes detection data of a sensor which detects a state of shake of the image sensing apparatus during an exposure period of each of the low-resolution images, and
the reference image setting portion selects the reference image based on the detection data of the sensor.

7. The image processing device according to claim 6, wherein the reference image setting portion selects the low-resolution image having the smallest shake of the image sensing apparatus during an exposure period as the reference image among the plurality of low-resolution images.

8. The image processing device according to claim 1, further comprising an object size detecting portion which detects a size of a specific object on the image included in each of the low-resolution images based on the image information, wherein
the reference image setting portion selects the reference image based on the detected size of the specific object.

9. The image processing device according to claim 1, further comprising a face state detecting portion which detects a human face in each of the low-resolution images and which detects a state of the human face based on the image information, wherein the reference image setting portion selects the reference image based on a detection result of the face state detecting portion.

10. The image processing device according to claim 1, wherein the reference image setting portion sets a low-resolution image other than the reference image as an object image among the plurality of low-resolution images, and the image processing device further comprises a displacement detecting portion which determines a displacement between the reference image and the object image by a resolution higher than a pixel interval of the reference image, and a high-resolution image generating portion which generates the high-resolution image by performing the resolution increasing process using the determined displacement and the plurality of low-resolution images with respect to the reference image.

11. An image sensing apparatus comprising:

an image sensing portion which obtains a plurality of low-resolution images arranged in a time sequence manner by sequential shooting; and the image processing device according to claim 1 which generates a high-resolution image with respect to the plurality of low-resolution images by a resolution increasing process.

12. An image sensing apparatus comprising:

an image sensing portion having an image sensor and an optical system which forms an optical image corresponding to an object on the image sensor so that a shot image is obtained;

a focus score estimating portion which estimates a focus score based on a video signal of a focus evaluation region set in the shot image, so as to perform automatic focus control by driving and controlling the optical system based on the focus score; and an image processing device which refers to a plurality of shot images obtained from the image sensing portion as the plurality of low-resolution images and which generates a high-resolution image from the plurality of low-resolution images, the high-resolution image having a resolution higher than a resolution of the low-resolution images, wherein the image processing device includes a reference image setting portion which selects a reference image from the plurality of low-resolution images based on the focus score estimated with respect to each of the low-resolution images, so as to generate the high-resolution image by performing a resolution increasing process on the plurality of low-resolution images for increasing a resolution with respect to the reference image.

13. The image sensing apparatus according to claim 12, wherein the automatic focus control is performed by driving and controlling the optical system so that the focus score becomes a maximum value, and the reference image setting portion selects the low-resolution image corresponding to a maximum focus score as the reference image among the plurality of low-resolution images.

14. The image sensing apparatus according to claim 12, wherein the reference image setting portion sets a low-resolution image other than the reference image as an object image among the plurality of low-resolution images, and the image processing device further includes a displacement detecting portion which determines a displacement between the reference image and the object image by a resolution higher than a pixel interval of the reference image, and a high-resolution image generating portion which generates the high-resolution image by performing the resolution increasing process using the determined displacement and the plurality of low-resolution images with respect to the reference image.

15. An image processing method which generates a high-resolution image from a plurality of low-resolution images, the high-resolution image having a resolution higher than a resolution of the low-resolution images, the method comprising the steps of:

selecting a reference image from the plurality of low-resolution images based on image information of the plurality of low-resolution images; and generating the high-resolution image by performing a resolution increasing process on the plurality of low-resolution images for increasing a resolution with respect to the reference image.

16. An image sensing apparatus comprising:

an image sensing portion which obtains a plurality of low-resolution images arranged in a time sequence manner by sequential shooting; and the image processing device according to claim 3 which generates a high-resolution image with respect to the plurality of low-resolution images by a resolution increasing process.

17. An image sensing apparatus comprising:

an image sensing portion which obtains a plurality of low-resolution images arranged in a time sequence manner by sequential shooting; and the image processing device according to claim 5 which generates a high-resolution image with respect to the plurality of low-resolution images by a resolution increasing process.

18. An image sensing apparatus comprising:

an image sensing portion which obtains a plurality of low-resolution images arranged in a time sequence manner by sequential shooting; and the image processing device according to claim 6 which generates a high-resolution image with respect to the plurality of low-resolution images by a resolution increasing process.

19. An image sensing apparatus comprising:

an image sensing portion which obtains a plurality of low-resolution images arranged in a time sequence manner by sequential shooting; and the image processing device according to claim 8 which generates a high-resolution image with respect to the plurality of low-resolution images by a resolution increasing process.

20. An image sensing apparatus comprising:

an image sensing portion which obtains a plurality of low-resolution images arranged in a time sequence manner by sequential shooting; and the image processing device according to claim 9 which generates a high-resolution image with respect to the plurality of low-resolution images by a resolution increasing process.

* * * * *